(12) United States Patent
Aihara et al.

(10) Patent No.: US 10,149,230 B2
(45) Date of Patent: Dec. 4, 2018

(54) MANAGEMENT OF A BLACKLIST FOR CONTROLLING A COMMUNICATION

(71) Applicant: INTERNATIONAL BUSINESS MACHINES CORPORATION, Armonk, NY (US)

(72) Inventors: Toru Aihara, Tokyo (JP); Shunichi Amano, Tokyo (JP); Tadanobu Inoue, Tokyo (JP); Noboru Kamijo, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/457,128

(22) Filed: Mar. 13, 2017

(65) Prior Publication Data
US 2018/0262971 A1 Sep. 13, 2018

(51) Int. Cl.
*H04W 48/04* (2009.01)
*H04W 4/80* (2018.01)
*H04L 29/08* (2006.01)

(52) U.S. Cl.
CPC ............ *H04W 48/04* (2013.01); *H04W 4/80* (2018.02); *H04L 67/12* (2013.01)

(58) Field of Classification Search
CPC .................................................... H04W 48/04
USPC ............................................... 455/410–413
See application file for complete search history.

(56) References Cited

U.S. PATENT DOCUMENTS

| | | | |
|---|---|---|---|
| 8,898,783 B2 | 11/2014 | Chung et al. | |
| 9,100,426 B1 | 8/2015 | Fang | |
| 9,253,010 B1* | 2/2016 | Nachenberg | H04L 29/06 |
| 9,736,152 B2* | 8/2017 | Isola | H04L 63/0876 |
| 2016/0173450 A1 | 6/2016 | Mircescu et al. | |

OTHER PUBLICATIONS

"Rogue Device Detection", https://www.pwnieexpress.com/solutions/rogue-device-detection, accessed on Mar. 1, 2017, pp. 1-5.

* cited by examiner

*Primary Examiner* — Michael T Vu
(74) *Attorney, Agent, or Firm* — Tutunjian & Bitetto, P.C.; Vazken Alexanian

(57) ABSTRACT

A computer-implemented method, a system, and a computer program product manage a blacklist. A server computer and method communicate with a device via a relay device, the relay device being connected to the device via a wireless network, in response to a detection of an improper device, adding, into a blacklist, information on a position of the improper device or information on a position associated with a position of the improper device, and an identifier of the improper device, wherein the blacklist is used for controlling commutation from or to an improper device. The blacklist or an identifier in the blacklist of a device associated with the information on the position of the improper device is transferred to a relay device in or near the position of the improper device and/or to a relay device in or near the position associated with the position of the improper device.

20 Claims, 24 Drawing Sheets

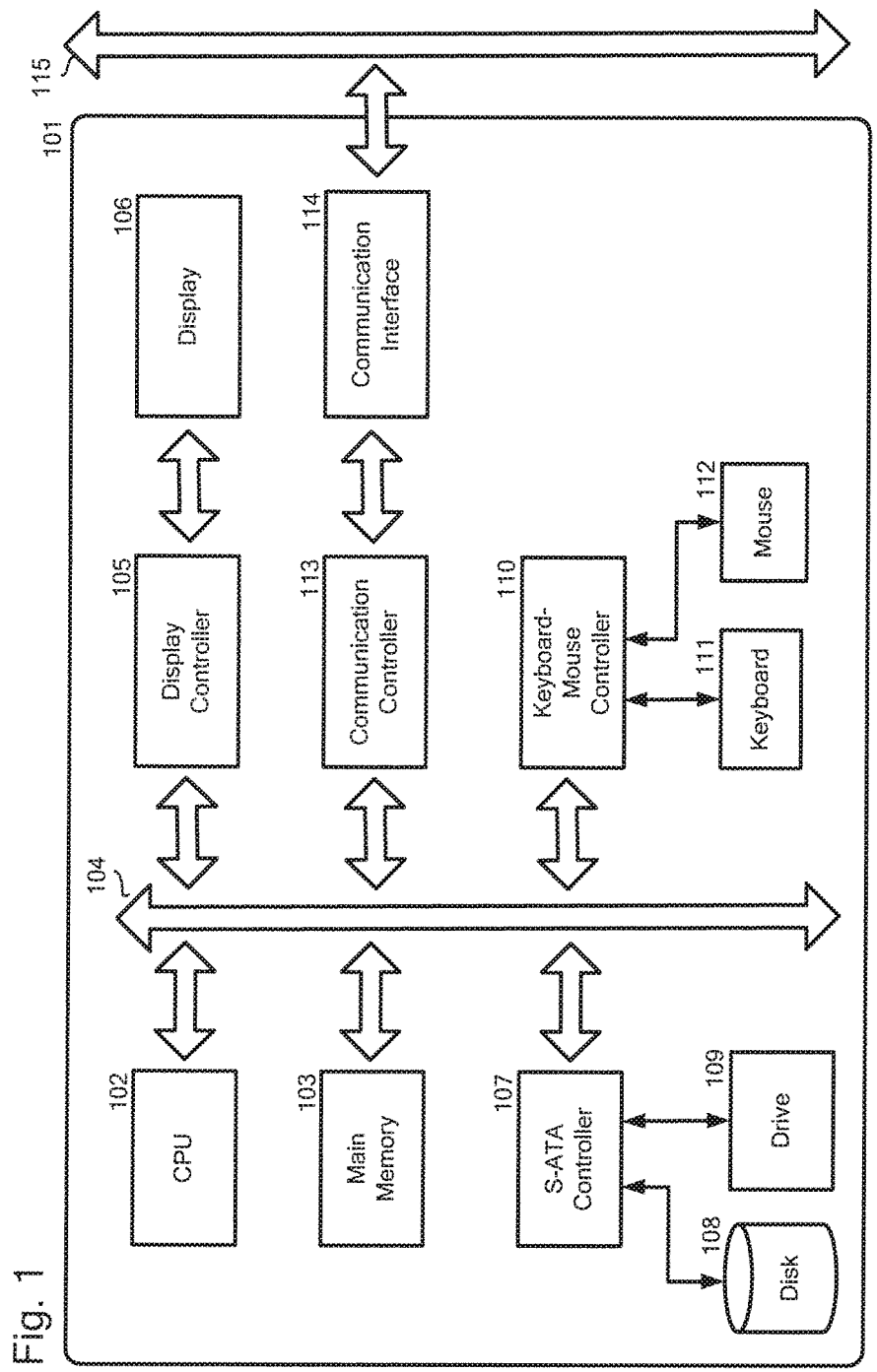

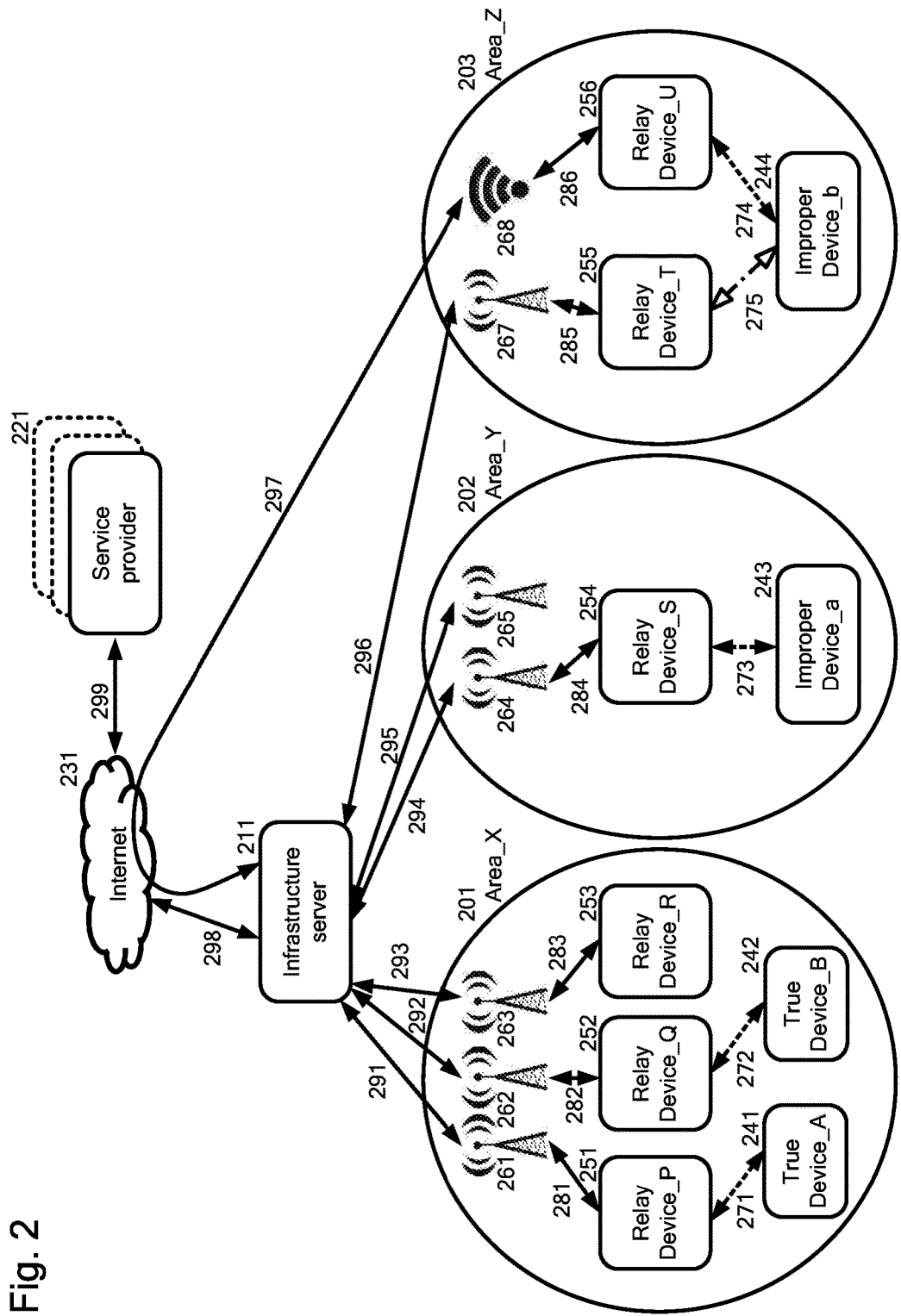

| Identifier | Information on a position |
|---|---|
| Device_a | Area_Y |
| Device_b | Area_Y |
| Device_c | Area_Z |
| ... | ... |

302

| Identifier | Information on a position | Timestamp when blocking is started | Timestamp when blocking is cancelled | The number of blocking | Timestamp when monitoring is cancelled | Relay Device |
|---|---|---|---|---|---|---|
| Device_a | Area_Y | 02/22/2017,10:03:03 | 02/22/2017,10:13:03 | 1 | 02/22/2017,10:33:03 | Device_S |
| Device_b | Area_Y | 02/22/2017,09:45:25 | 02/22/2017,10:25:25 | 3 | 02/22/2017,10:45:25 | Device_T |
| Device_c | Area_Z | 02/22/2017,09:30:45 | 02/22/2017,10:00:45 | 2 | 02/22/2017,10:20:45 | Device_U |
| ... | ... | ... | ... | ... | ... | ... |

Fig. 3B

| Identifier | Information on a position | Latest communication time |
|---|---|---|
| Device_S | (X1, Y1, Z1) | 02/22/2017,10:03:03 |
| Device_T | (X1, Y1, Z1) | 02/22/2017,09:45:25 |
| Device_W | (X2, Y2, Z1) | 02/22/2017,10:11:49 |
| ... | ... | ... |

| Identifier | Timestamp when blocking is started | Timestamp when blocking is cancelled | The number of blocking | Timestamp when monitoring is cancelled |
|---|---|---|---|---|
| Device_a | 02/22/2017,10:03:03 | 02/22/2017,10:13:03 | 1 | 02/22/2017,10:33:03 |
| Device_b | 02/22/2017,09:45:25 | 02/22/2017,10:25:25 | 3 | 02/22/2017,10:45:25 |
| ... | ... | ... | ... | ... |

321

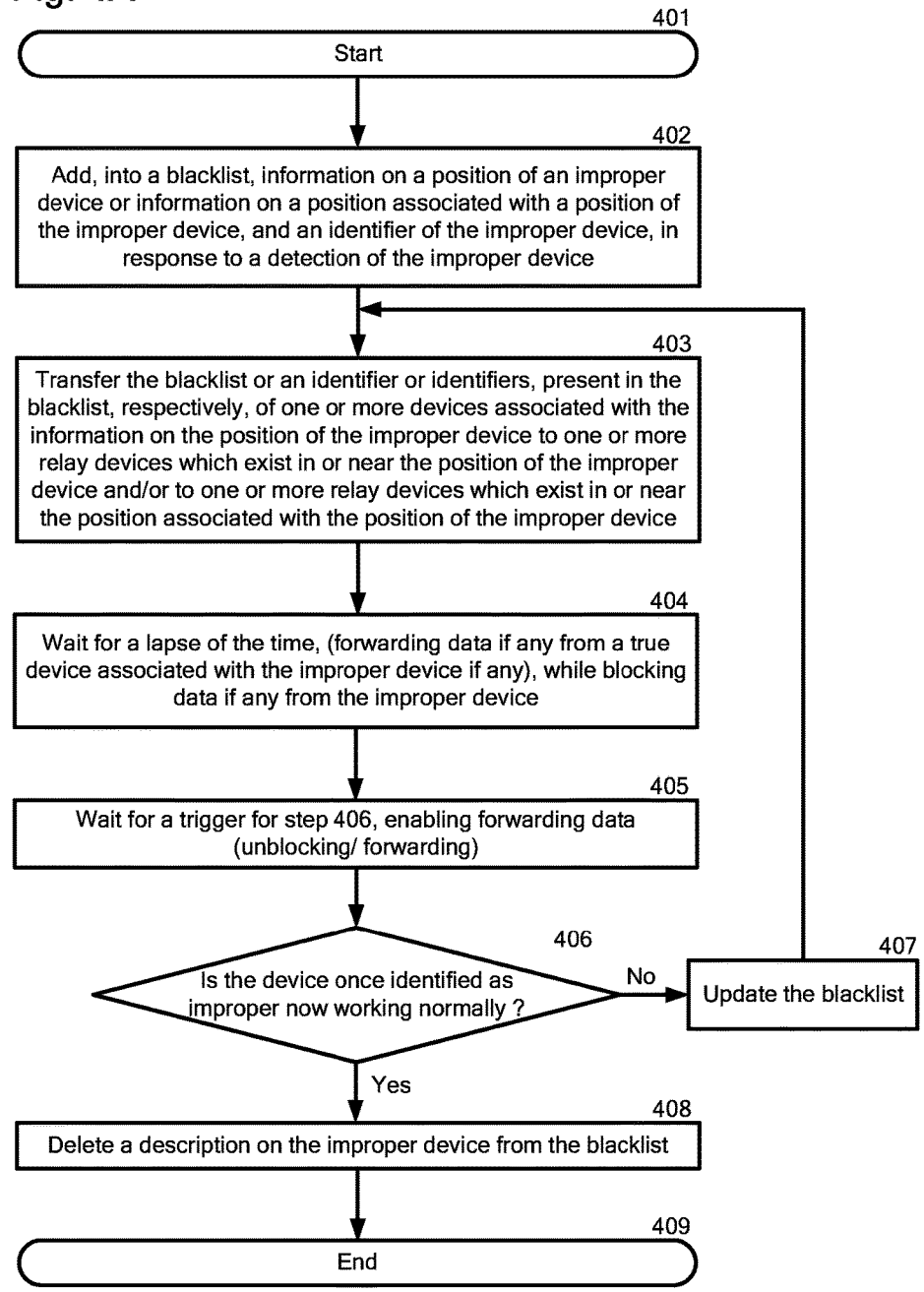

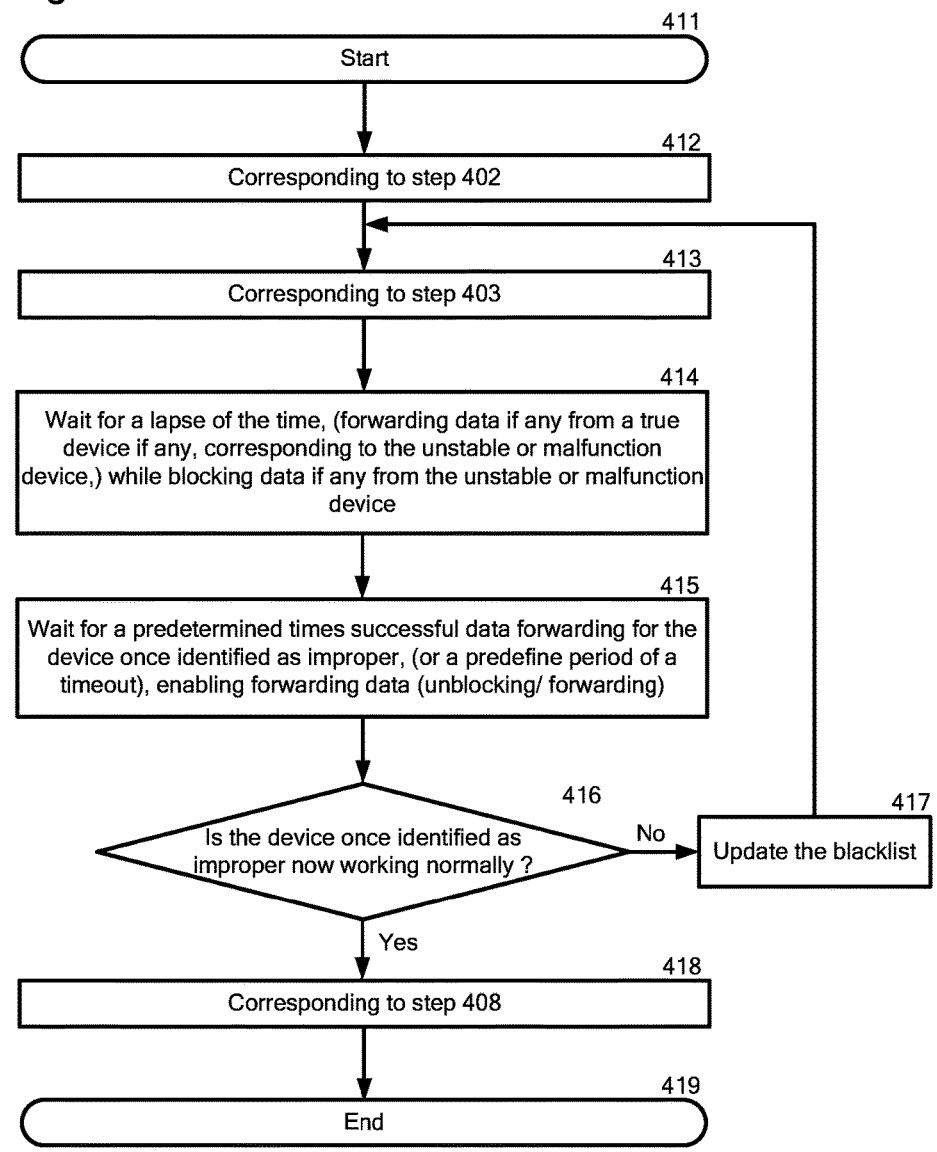

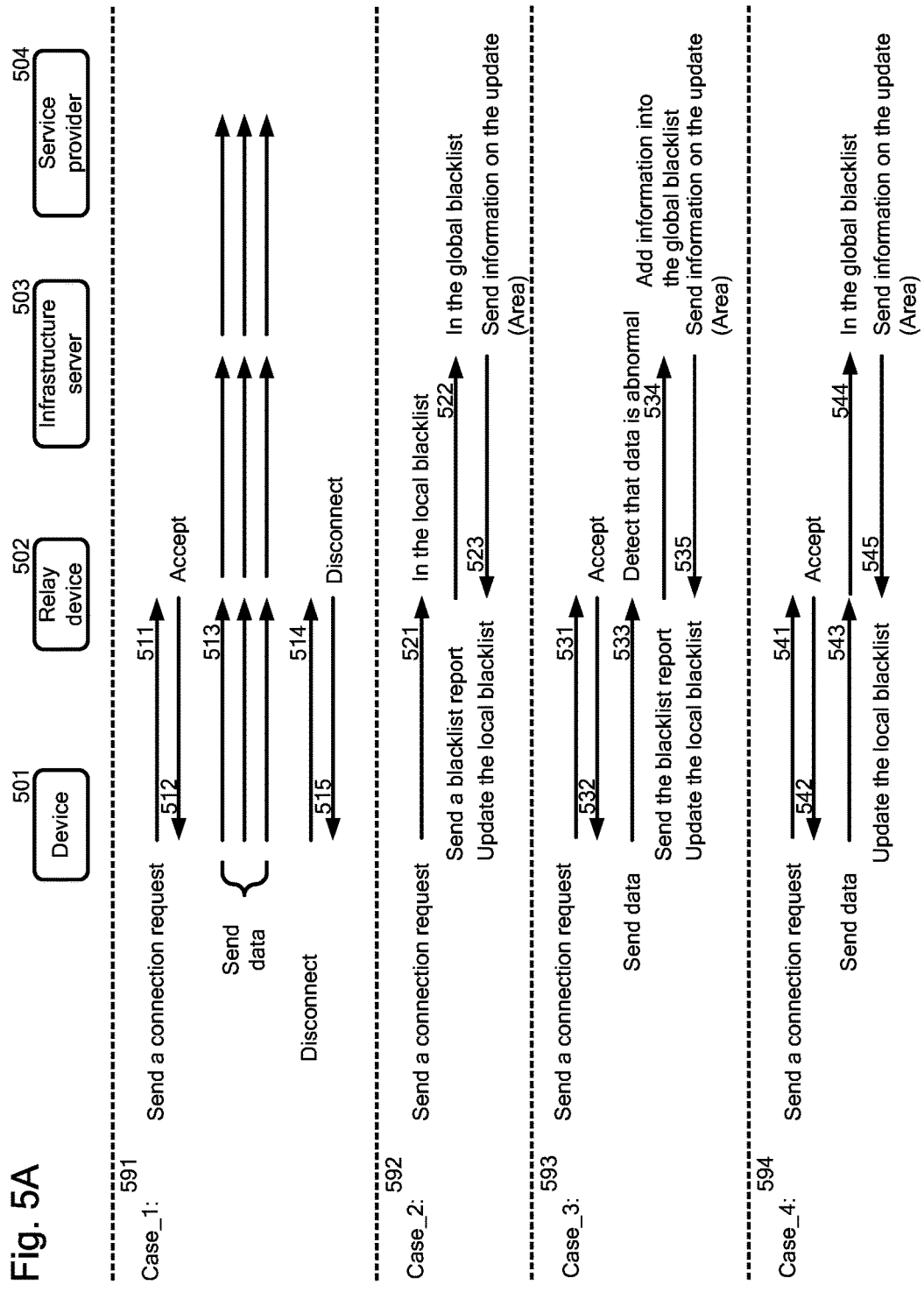

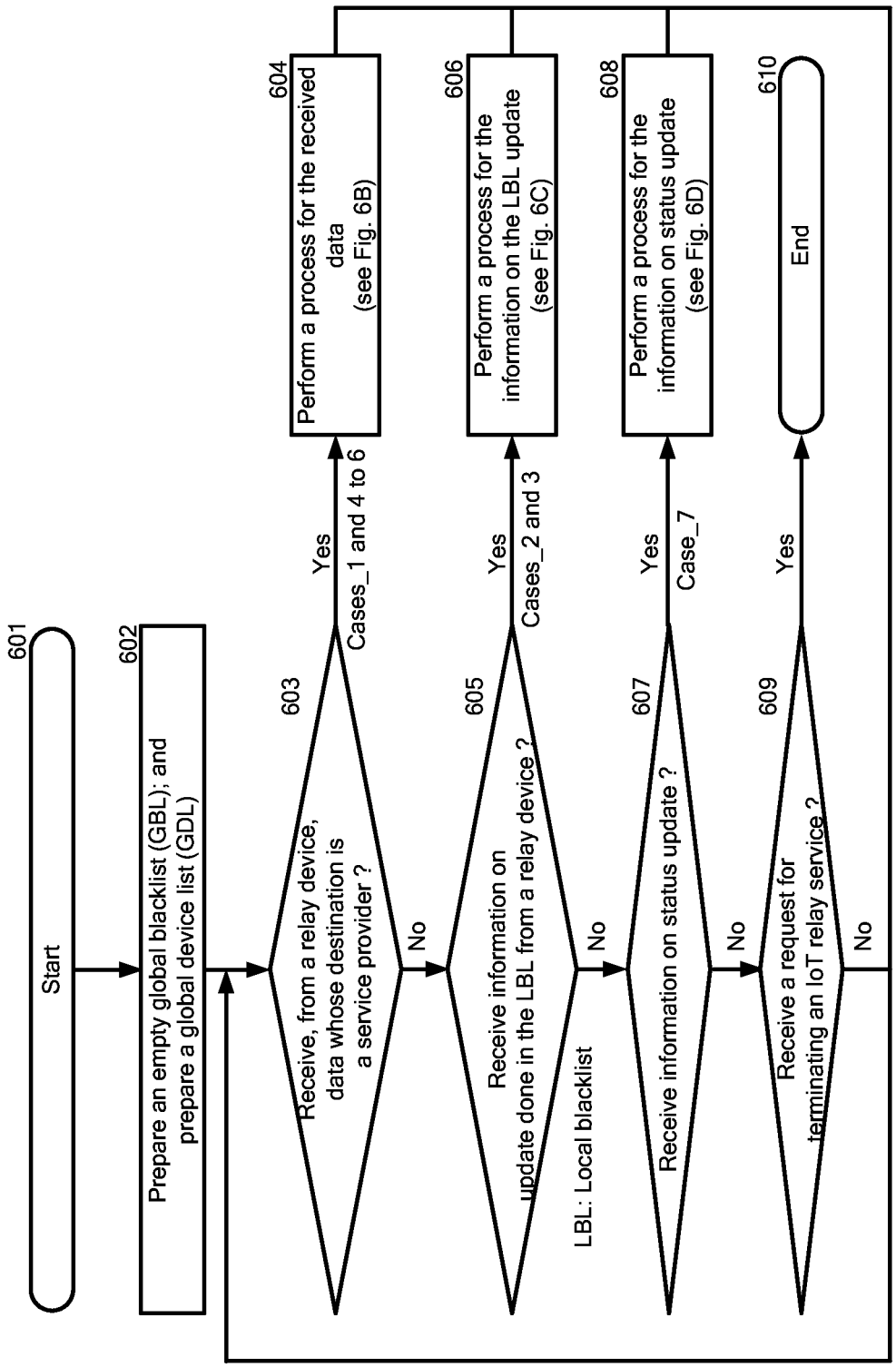

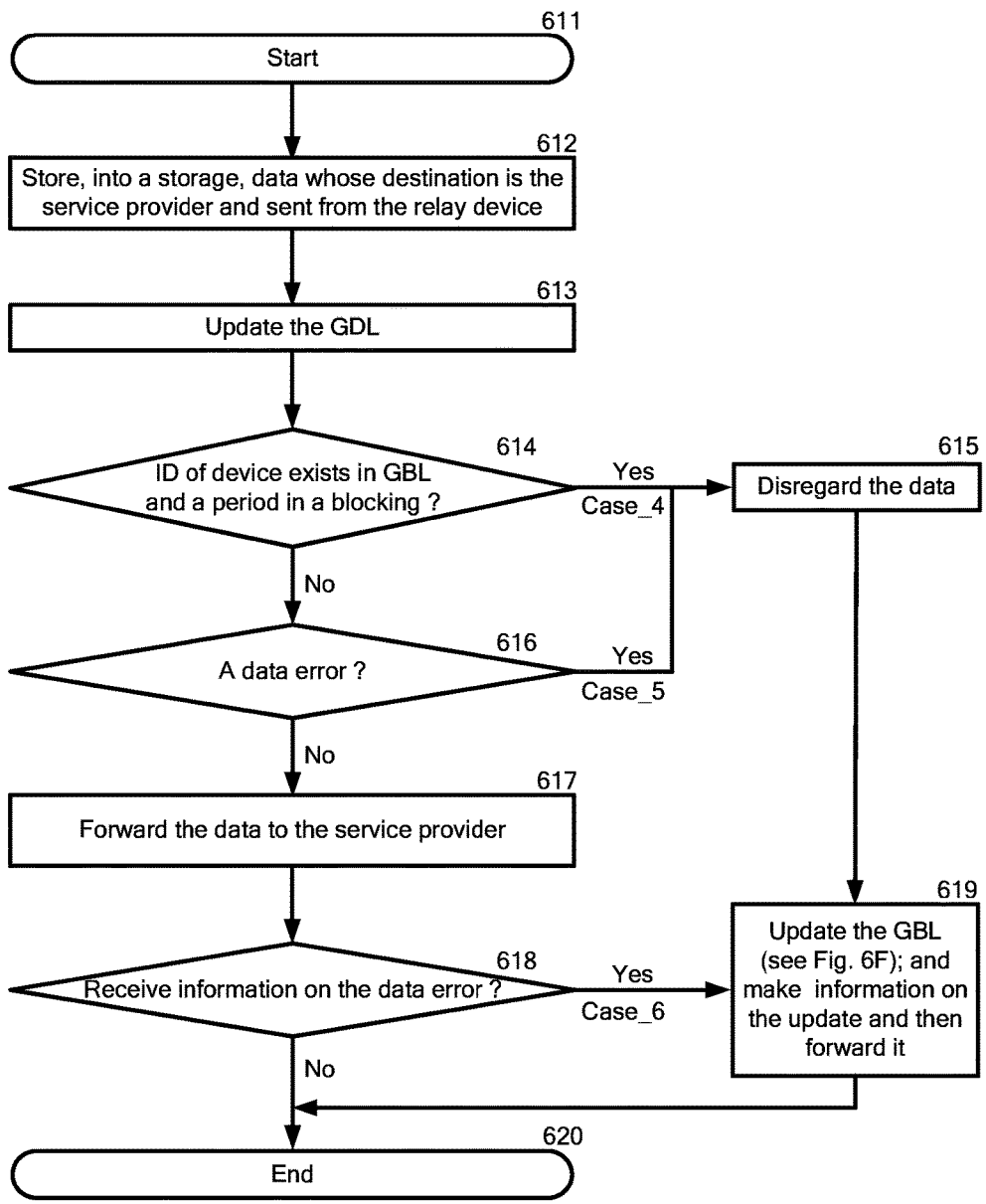

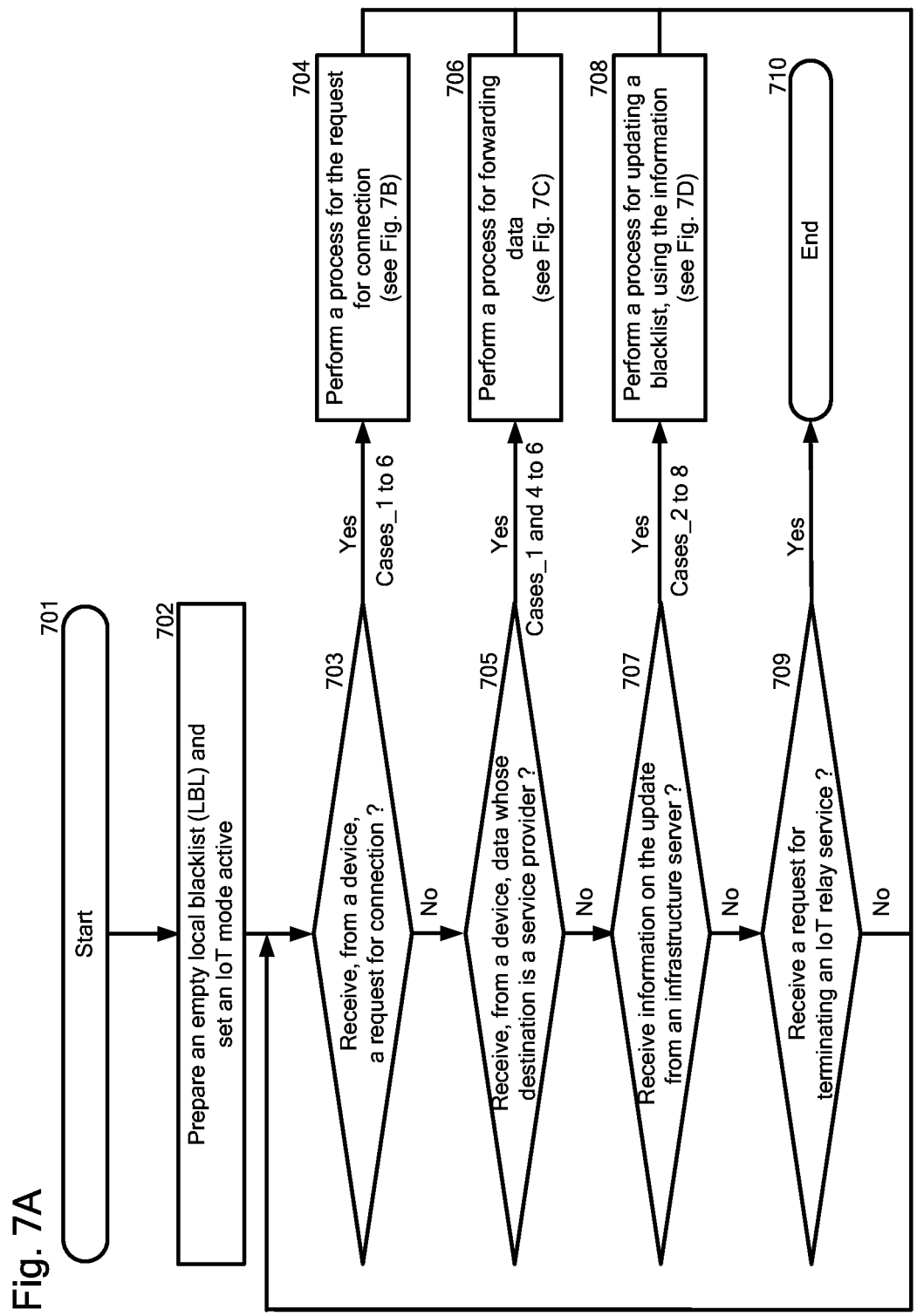

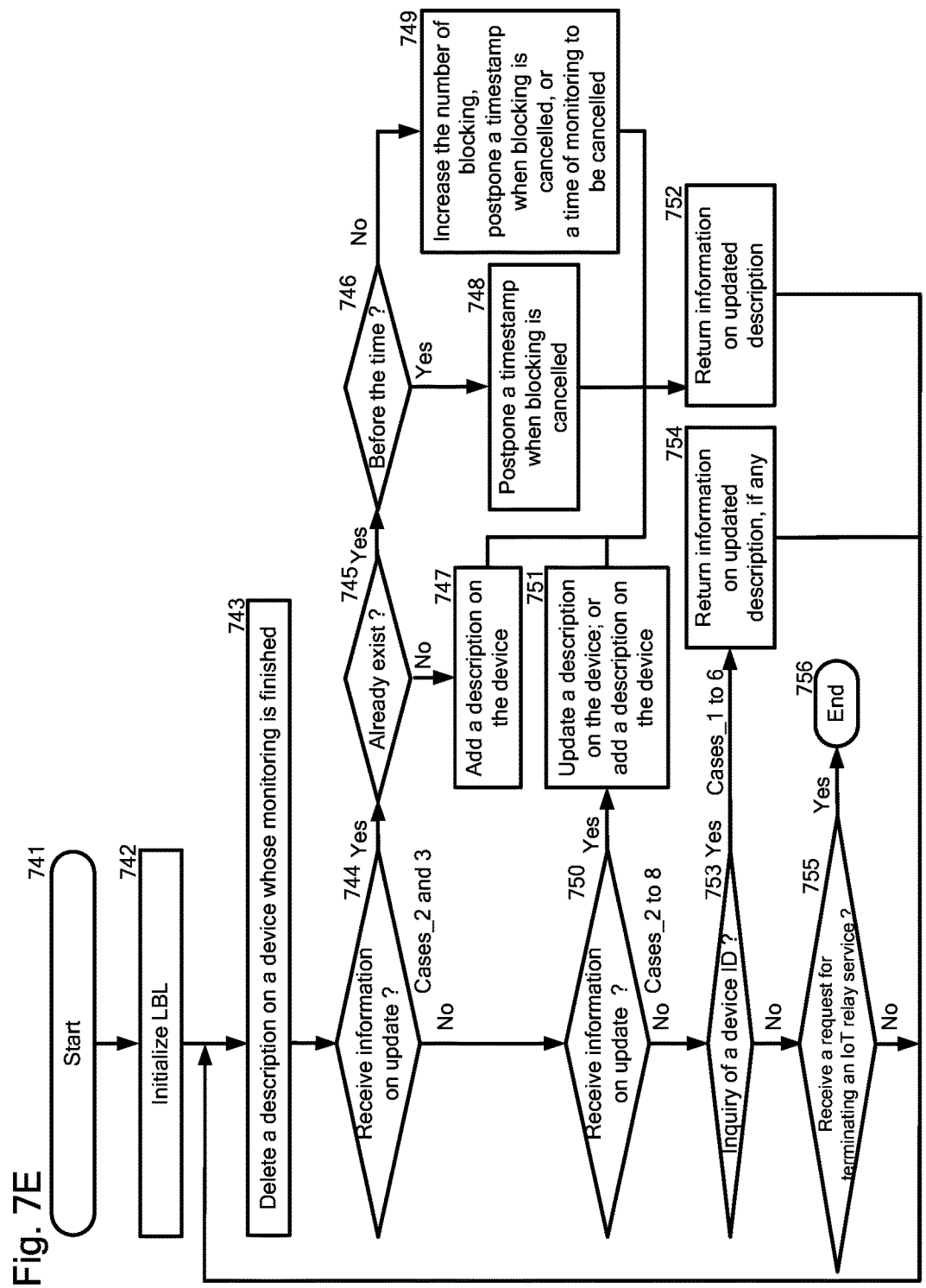

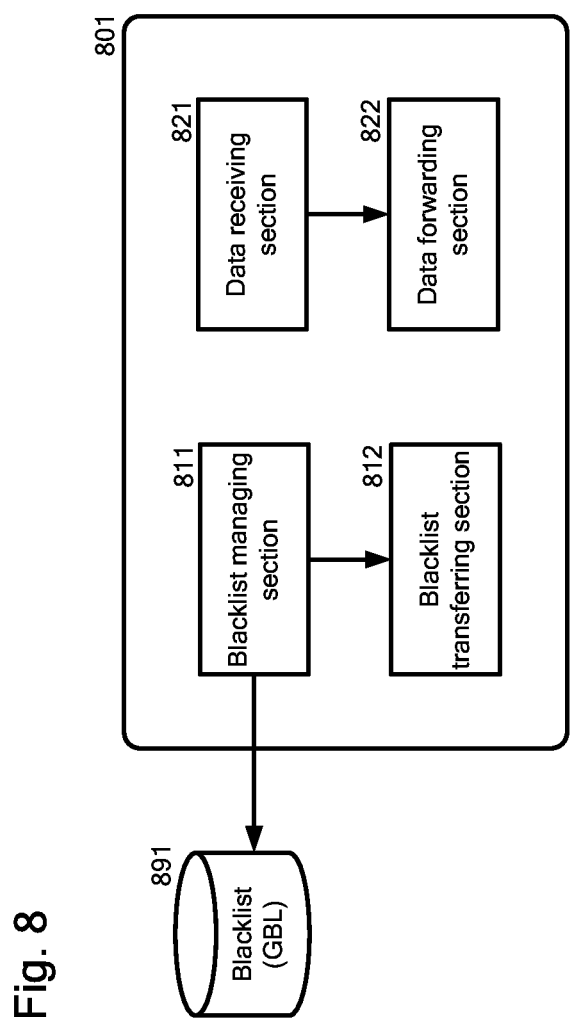

MANAGEMENT OF A BLACKLIST FOR CONTROLLING A COMMUNICATION

BACKGROUND

Technical Field

This invention relates generally to communication control, and, more specifically to a technique for controlling a communication from or to an improper device.

Related Art

Bluetooth Low Energy (BLE) which consumes a very low energy is now equipped as standard on portable devices such as smartphones, so devices and services using the BLE are rapidly increasing.

A physical activity meter which can be wearable by a part on a user can obtain various data, for example, but not limited to, the number of steps, walking or running distance, used calories, sleeping hours, cardiac rate, pulse rate or a combination of these, by using one or more sensors embedded in the physical activity meter. The obtained data is transferred to a smartphone using the BLE and then further forwarded to a server computer from the smartphone in order to provide a user of the smartphone with analysis results obtained by analyzing the data or to store this data as a part of big data.

SUMMARY

According to one aspect of the present invention, an embodiment of the present invention provides a computer-implemented method for managing a blacklist, the server computer being able to communicate with a device via a relay device, and the relay device being connected to the device via a wireless network. The method comprises: in response to a detection of an improper device, adding, into a blacklist, information on a position of the improper device or information on a position associated with a position of the improper device, and an identifier of the improper device, the blacklist being used for controlling commutation from or to an improper device; and transferring the blacklist or an identifier (hereinafter refer to as "ID") or identifiers (IDs), present in the blacklist, respectively, of one or more devices associated with the information on the position of the improper device to one or more relay devices which exist in or near the position of the improper device and/or to one or more relay devices which exist in or near the position associated with the position of the improper device.

According to another aspect of the present invention, a system, such as a computer system, comprising a processor and a memory storing a program of instructions executable by the processor to perform one or more methods described herein may be provided.

According to another aspect of the present invention, a computer program product comprising a computer readable storage medium storing a program of instructions executable by a system to perform one or more methods described herein also may be provided.

BRIEF DESCRIPTION OF THE DRAWINGS

The disclosure will provide details in the following description of preferred embodiments with reference to the following figures.

FIG. 1 illustrates an exemplified basic block diagram of a computer hardware used in a server computer according to an embodiment of the present invention.

FIG. 2 illustrates one embodiment of a diagram of managing a blacklist used for controlling commutation from or to an improper device.

FIG. 3A illustrates embodiments of a blacklist used by an infrastructure server described in FIG. 2.

FIG. 3B illustrates embodiments of a global device list used in the diagram described in FIG. 2.

FIG. 3C illustrates embodiments of a blacklist used by each device described in FIG. 2.

FIGS. 4A and 4B illustrate one embodiment of a flowchart of a process for managing a blacklist used for controlling commutation from or to an improper device.

FIG. 4C illustrates another embodiment of a flowchart of a process for managing a blacklist used for controlling commutation from or to an improper device.

FIGS. 5A and 5B illustrate embodiments of eight patterns of detecting an improper device in order to manage a blacklist used for controlling commutation from the improper device.

FIGS. 6A, 6B, 6C, 6D, 6E and 6F illustrate flowcharts of a process for managing, by a server computer which can communicate with a device via a relay device, a blacklist used for controlling commutation from or to an improper device.

FIG. 8 illustrates an embodiment of an overall functional block diagram of a server computer used in accordance with the embodiment of the flowchart described in FIGS. 6A to 6F.

DETAILED DESCRIPTION

Figure 4B:
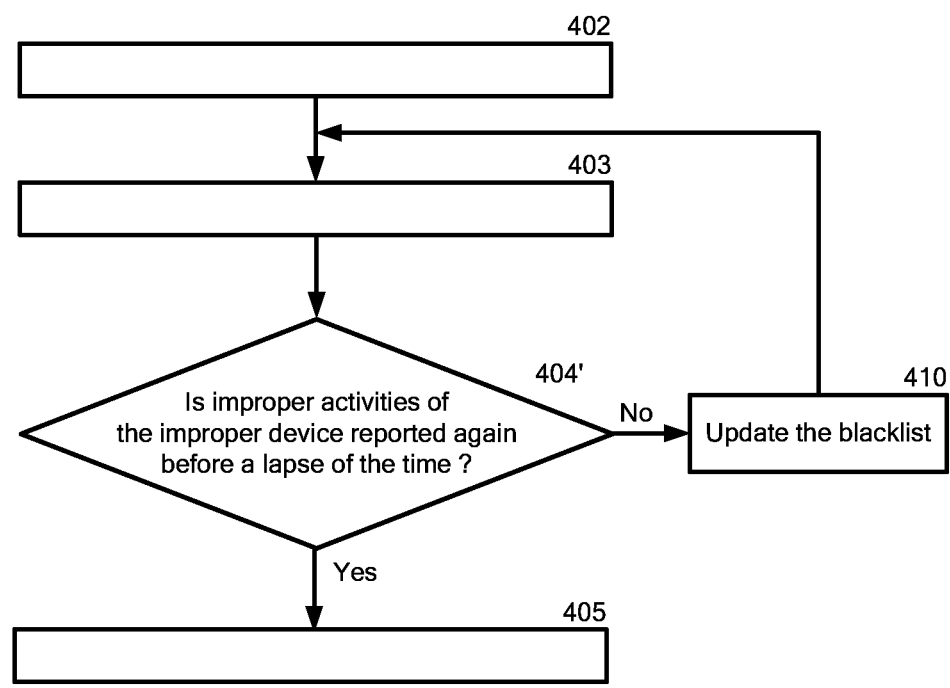

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "a device", may be, any devices including a wireless communication function to communicate with a relay device using a communication network. The wireless communication function may be, for example, but not limited to, Bluetooth Low Energy, the Bluetooth or the Wi-Fi. The device can send data to a server computer via the relay device using a wireless network. The device may be, for example, but not limited to, an Internet of Things (hereinafter referred also to as "IoT") device, a card device, a smartphone, a mobile phone, a tablet or a notebook computer. The IoT device may include, for example, but not limited to a variety of sensors such as a temperature sensor, humidity sensor, illuminance sensor, human sensor, or acceleration sensor, thermostats, light bulbs, door locks, fridges, cars, implants for RFID and pacemakers. The card device may include, for example, but not limited to, smart cards such as transportation system IC cards, credit cards, debit cards, bank cards, health insurance cards, public card phones, and B-CAS cards.

The term, "improper device", may include an unstable device, a malfunction device or a malicious device. The unstable device may refer to any device which action is unstable due to low battery, a device runaway, a communication problem, a software bug, or a combination thereof. The malfunction device may refer to any device which has a physical or software malfunction. The malicious device may refer to any device which disguises a true device or pretends to be a true device by having the identification the same as that of the true device, but does not function well or even disturbs services.

The term, "true device", may refer to any device which acts normally.

The term, "wireless network", may refer to a wireless personal network which may be used for making a communication between a device and a relay device. The wireless personal network may be implemented using the Bluetooth® Low Energy, the Bluetooth® or the Wi-Fi®.

The term, "a relay device", may refer to any device which relays data sent from the device to an infrastructure server mentioned below. The relay device may be, for example, but not limited to, a smartphone, a mobile phone, a tablet, a computer, a communication terminal such as a Wi-Fi® terminal.

The term, "a server computer", may refer to any computer which receives data sent from devices via relay devices or receives data directly from devices. The server computer may be, for example, but not limited to, an infrastructure server. The infrastructure server may be, for example but not limited to, a service server which is owned by a cellular service provider or an internet service provider, or an IoT infrastructure server.

The term, "a service provider", may refer to any computer which receives data sent from devices via a relay device or a combination of a relay device and a server computer. The server provider may analyze data and then generate a result of the analysis. The server provider may be, for example but not limited to, an IoT service provider which provides services using IoT devices.

The term, "a blacklist", may refer to a list used for controlling commutation from or to an improper device. An embodiment of the blacklist will be explained by referring to FIGS. 3A and 3C mentioned below. The blacklist may be stored in a storage to which the server computer or relay device may access.

With reference now to FIG. 1, FIG. 1 illustrates an exemplified basic block diagram of a computer hardware used in a server computer according to an embodiment of the present invention.

A computer (101) may be a server computer according to an embodiment of the present invention. The server computer may be, for example, but is not limited to, a desktop-, laptop-, notebook-, tablet- or blade-type computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

In a case where a device wants to send data to a server computer such as an infrastructure server, a user needs to carry her or his smartphone as a relay device which has already been paired with the device. However, a problem of usability occurs since the smartphone needs to be paired with the device in advance. Further, there is another problem that the cost for a communication line used by the smartphone is relatively high.

For overcoming these problems there is a method for allowing anyone to connect a smartphone of another. However, in this method, there are some problems as mentioned below: the smartphone may be used as a relay device even for malicious purposes; a device can use the Internet for any purpose; and the communication bandwidth used by the smartphone increases.

Accordingly, there is a necessity to prevent attacks sent from improper devices. Further, there is a necessity that a normal device can send data to a server computer without blocking the data in a case where a malicious device exists separately from the normal device.

Hereinafter, an embodiment of the present invention will be described with reference to the following FIG. 2, FIGS. 3A to 3C, FIGS. 4A to 4E, FIGS. 5A and 5B, FIGS. 6A to 6F, FIGS. 7A to 7E and FIG. 8.

With reference now to FIG. 2, FIG. 2 illustrates one embodiment of a diagram of managing a blacklist used for controlling commutation from or to an improper device.

FIG. 2 shows an infrastructure server (211), a service provider (221), a plurality of relay devices (251 to 256) and a plurality of devices (241 to 244).

The infrastructure server (211) may communicate with (298, 299) one or more service providers (221) via an internet (231). The infrastructure server (211) may forward data sent from devices to one or more service providers (221) via an internet (231), in a case where ID of a device is not listed in a blacklist which may be stored in storage. The infrastructure server (211) can access the storage which may be in the infrastructure server (211) or may be connected to the infrastructure server (211) via a wireless or wired communication.

The infrastructure server (211) can access a backlist in which at least one set of device ID and information on a position of the improper device or information on a position associated with a position of the improper device, and an ID of the improper device may be stored. This blacklist may be used by the infrastructure server (211) and is called as a global blacklist (hereinafter referred also to as "GBL") in an embodiment of the present invention. Embodiments of the GBL will be explained by referring to FIG. 3A mentioned below.

With reference now to FIG. 3A, FIG. 3A illustrates embodiments of the GBL used in an embodiment of the present invention.

The GBL (301) may have at least one set of identifiers of a device and information on a position. The GBL (301) may be managed, for example, in a form of a list.

The identifier of a device may be a unique identifier associated with the device. The identifier may be, for example, but not limited to, a MAC address assigned to a device, a manufacturing number assigned to a device, or a combination thereof.

The information on a position may be information on a position of an improper device, or information on a position associated with a position of an improper device.

The information on a position of an improper device may be, for example, but not limited to, a GPS information of the improper device, a name of area in which the improper device exists, or an XYZ position of the improper device.

The information on a position associated with a position of an improper device may be, for example, but not limited to, a GPS information of a relay device, base station or wireless access point such as Wi-Fi® spot, a name of area in which a relay device, base station or wireless access point such as Wi-Fi® spot exists, or an XYZ position of a relay device, base station or wireless access point such as Wi-Fi® spot.

In another embodiment, the GBL (302) may have at least one set of identifier of a device, information on a position, and further at least one of a timestamp (or date/time, hereinafter the term, "time", denotes date/time) when blocking of communication from or to an improper device is started (hereinafter referred also to as "a blocking starting time" or "a time when blocking of communication is started"), a time when blocking of an improper device is cancelled (hereinafter referred also to as "a blocking cancelling time" or "a time when blocking is cancelled"), the number of blocking, a time when monitoring of the improper device is cancelled (hereinafter referred also to as "a monitoring cancelling time" or "a time when monitoring is cancelled"), and an ID of a relay device or an ID of a wireless access point such as Wi-Fi® spot.

The above-mentioned explanations paragraphs [0047] to [0051] can be applied also to the identifier of a device and the information on a position.

The blocking starting time may define a starting time that a communication from or to an improper device is blocked on a relay device or an infrastructure server. The communication from or to an improper device may be, for example, but not limited to, a receipt of data sent from a device or a request for transferring data sent from a device.

The blocking cancelling time may define an ending time that a blocking of communication from or to an improper device is terminated on a relay device or an infrastructure server. The communication from or to an improper device may be, for example, but not limited to, a receipt of data sent from a device or a request for transferring data sent from a device.

The monitoring cancelling time may define an ending time that a monitoring of an improper device is terminated on a relay device or an infrastructure server. In some embodiments, the monitoring cancelling time in GBL is optional.

The number of blocking may refer to the number of blocking repeatedly started until the monitoring is cancelled. The number increases when blocking starts repeatedly with a new a blocking starting time, after the previous/latest blocking cancelling time, but before the previous/latest monitoring cancelling time, in response to a re-detection of the improper device.

The identifier of a relay device may be, for example, but not limited to, a MAC address assigned to the relay device, a manufacturing number assigned to the relay device, or a combination thereof.

The identifier of a wireless access point such as Wi-Fi® spot may be, for example, but not limited to, a MAC address assigned to the relay device, a manufacturing number assigned to the relay device, a telephone number, or a combination thereof. Optionally, each field for information on a position and the identifier for a relay device may include a list of positions (such as Area_Z, Area_Y) and a list of relay devices (such as Device_U, Device S), respectively, that reported the improper device. These lists are useful to track the improper device, when the improper device and/or the one or more relay devices are moving. The infrastructure server can predict the future location of the improper device and thus future relay devices that may encounter the improper device, based on the past history.

When the list becomes too long, the GBL may limit the number of positions and relay devices, such as latest 10 positions and devices and/or positions and devices reported in an hour.

With reference now back to FIG. 2, the infrastructure server (211) can access a global device list (hereinafter referred also to as "GDL") in which at least one set of an ID of a relay device, information on a position of the relay device, and latest communication time for the relay device are stored. Embodiments of the GDL will be explained by referring to FIG. 3B mentioned below.

With reference now to FIG. 3B, FIG. 3B illustrates embodiments of the GDL used in an embodiment of the present invention.

The GDL (311) may have at least one set of an ID of a relay device, information on a position of the relay device, and latest communication time for the relay device.

The identifier of the relay device may be a unique identifier associated with the relay device. The identifier may be, for example, but not limited to, a MAC address assigned to a relay device, a manufacturing number assigned to a relay device, or a combination thereof.

The information on a position of the relay device may be information on a position of a relay device, or information on a position associated with a position of a relay device.

The latest communication time for the relay device may be the time when the latest communication the relay device was performed. The communication for the relay device may be between the device and the relay device or between the infrastructure server and the relay device.

With reference now back to FIG. 2, each of the relay devices (251 to 256) can access each backlist in which at least one set of device ID may be stored. Each blacklist may be used by each of the relay devices (251 to 256) and is called as a local blacklist, i.e. the LBL, in an embodiment of the present invention. Embodiments of the LBL will be explained by referring to FIG. 3C mentioned below.

The LBL (321) may have at least one set of identifier of a relay device and further may have at least one of a time when blocking of communication from or to an improper device is started (i.e. "a blocking starting time" or "a time when blocking of communication is started"), a time when blocking of an improper device is cancelled (i.e. hereinafter referred also to as "a blocking cancelling time" or "a time when blocking is cancelled"), and the number of blocking, a time when monitoring of the improper device is cancelled (i.e. "a monitoring cancelling time" or "a time when monitoring is cancelled").

It can be said that the LBL (321) is a part of the GBL (302) described in FIG. 3A.

With reference now back to FIG. 2, let us suppose that there are the following three areas: Area_X (201), Area_Y (202) and Area_Z (203), that Device_A (241) and Device_B (242) are true devices; and that Device_a (243) and Device_b (244) are improper devices. Further, let us suppose the following: Improper Device_a (243) pretends True Device_A (241) or behaves as True Device_A (241); and Improper Device_b (244) pretends to be True Device_B (242) or behaves as True Device_B (242), typically, in terms of their device IDs.

In Area_X (201), there exist three base stations (261, 262 and 263); three relay devices, Relay Device_P (251), Relay Device_Q (252) and Relay Device_R (253); and two true devices, True Device_A (241) and True Device_B (242). Relay Device_P (251) may communicate with (281, 291) the infrastructure server (211) via the base station (261). Relay Device_Q (252) may communicate with (282, 292) the infrastructure server (211) via the base station (262). Relay Device_R (253) may communicate with (283, 293) the infrastructure server (211) via the base station (263). True Device_A (241) may communicate with (271) Relay Device_P (251) via a wireless network. True Device_B (242) may communicate with (272) Relay Device_Q (252) via a wireless network.

In Area_Y (202), there are two base stations (264 and 265); one relay device, Relay Device_S (254); and one improper device, Improper Device_a (243). Relay Device_S (254) may communicate with (284, 294) the infrastructure server (211) via the base station (264). Improper Device_a (243) may communicate with (273) Relay Device_S (254) via a wireless network.

In Area_Z (203), there are one base station (267) and one Wi-Fi® spot (268); two relay devices, Relay Device_T (255) and Relay Device_U (256); and one improper device, Improper Device_b (244). Relay Device_U (256) may communicate with (286, 297) the infrastructure server (211) via the internet (231) without using the base station (267). Improper Device_b (244) may communicate with (274) Relay Device_S (256) via a wireless network.

First, Device_a (243) sends data to Relay Device_S (254) via the wireless network (273). Relay Device_S (254) then forwards the received data to the infrastructure server (211) via the base station (261). The infrastructure server (211) detects that Device_a (243) is improper due to, for example, invalid destination of data. Accordingly, the infrastructure server (211) add, into the GBL, information of ID of improper Device_a (243) together with information on a position of Improper Device_a (243) or information on a position associated with a position of Improper Device_a (243). The information on the position of Improper Device_a (243) may be GPS information on Improper Device_a (243). The information on the position associated with the position of Improper Device_a (243) may be GPS information on Relay Device_S (254) or GPS information on the base station (264).

Similarly, Device_b (244) sends data to Relay Device_U (256) via the wireless network (274). Relay Device_U (256) then forwards the received data to the infrastructure server (211) via the internet (231). The infrastructure server (211) detects that Device_b (244) is improper. Accordingly, the infrastructure server (211) adds, into the GBL, information of ID of Improper Device_b (244) together with information on a position of Improper Device_b (244) or information on a position associated with a position of Improper Device_b (244). The information on the position of Improper Device_b (244) may be GPS information on Improper Device_b (244). The information on the position associated with the position of Improper Device_b (244) may be GPS information on Relay Device_U (256) or GPS information on the Wi-Fi® spot (268).

Accordingly, the GBL has at least the following descriptions, for example, as seen in the GBL (301) described in FIG. 3A: information on an ID of Improper Device_a (243) and on the position mentioned above; and information on an ID of Improper Device_b (244) and on the position mentioned above.

The infrastructure server (211) may transfer the GBL or a part of the GBL to one or more devices which exist in or near the position of the Improper Device_a (243) and/or to one or more relay devices which exist in or near the position associated with the position of the Improper Device_a (243). Accordingly, the infrastructure server (211) sends the GBL or the part of the GBL to Relay Device_S (254) and then Relay Device_S (254) receives the GBL itself or the part of the GBL. The part of the GBL may be the information on Improper Device_a (243), as seen in the LBL (321) described in FIG. 3C.

Similarly, the infrastructure server (211) may transfer the GBL itself or a part of the GBL to one or more devices which exist in or near the position of the Improper Device_b (244) and/or to one or more relay devices which exist in or near the position associated with the position of the Improper Device_b (244). Accordingly, the infrastructure server (211) sends the GBL itself or the part of the GBL to Relay Device_T (255) and Relay Device_U (256) and then each of Relay Device_T (255) and Relay Device_U (256) receives GBL itself or the part of the GBL. The part of the GBL may be the information on Device_b (244), as seen in the LBL (321) described in FIG. 3C.

In a case where Improper Device_a (243) again sends data to Relay Device_S (254), Relay Device_S (254) refers to the LBL and then finds that the LBL has the ID of Improper Device_a (243). Accordingly, Relay Device_S (254) disregards the data without transferring the data to the infrastructure server (211).

In a case where Improper Device_b (244) again sends data to Relay Device_U (256), Relay Device_U (256) refers to the LBL and then finds that the LBL has the ID of Improper Device_b (244). Accordingly, Relay Device_U (256) disregards the data without transferring the data to the infrastructure server (211).

Similarly, in a case where Improper Device_b (244) sends data to Relay Device_T (255) instead of sending data to Relay Device_U (256), Relay Device_T (255) refers to the received blacklist and then finds that the LBL has the ID of Improper Device_b (244). Accordingly, Relay Device_T (255) disregards the data without transferring the data to the infrastructure server (211).

Let us suppose that in a case where True Device_A (241) is in Area_Y (202) and sends data to Relay Device_S (254), Relay Device_S (254) refers to the LBL and then finds that the LBL has the ID of True Device_A (241) which is pretended by Improper Device_a (243). Consequently, Relay Device_S (254) disregards the data sent from True Device_A (241) without transferring the data to the infrastructure server (211). Meanwhile, in a case where True Device_A (241) is in Area_X (201) as illustrated in FIG. 2 and sends data to Relay Device_P (251), Relay Device_P (251) refers to the LBL and then does not find that the LBL has the ID of True Device_A (241). Consequently, Relay Device_P (251) forwards the data to the infrastructure server (211) via the base station (261), even though there is Improper Device_a (243) in Area_Y (202) which is different from Area_X (201).

Let us suppose that in a case where True Device_B (242) is in Area_Z (203) and sends data to Relay Device_T (255), Relay Device_T (255) refers to the LBL and then finds that the LBL has the ID of True Device_B (242) which is pretended by Improper Device_b (244). Consequently, Relay Device_S (254) disregards the data sent from the True Device_B (242) without transferring the data to the infrastructure server (211). Meanwhile, in a case where True Device_B (241) is in Area_X (201) as illustrated in FIG. 2 and sends data to Relay Device_Q (252), Relay Device_Q (252) refers to the LBL and then does not find that the LBL has the ID of True Device_B (241). Consequently, Relay Device_Q (252) forwards the data to the infrastructure server (211) via the base station (262), even though there is Improper Device_b (244) in Area_Z (203) which is different from Area_X (201).

As mentioned above, a true device is not disturbed as long as a position of this true device is not closer to that of an improper device which pretends this true device.

Further, in a case where the part of GBL is sent to relay devices, the relay devices can save a volume to be required for saving the LBL and further a communication bandwidth between the infrastructure server and each of relay devices can be saved.

FIGS. 4A to 4C illustrate embodiments of a flowchart of a process for managing a blacklist used for controlling commutation from or to an improper device.

In each step described in FIGS. 4A to 4C, a subject is a server computer, such as the infrastructure server (211) described in FIG. 2. The GBL and LBL may be in advance prepared for controlling commutation from or to an improper device. Alternatively, the GBL and LBL may be dynamically generated in the infrastructure server (211) or in each of the relay devices, respectively.

With reference now to FIG. 3C, FIG. 3C illustrates embodiments of a blacklist used by each of devices described in FIG. 2.

The LBL (321) may have at least one set of identifier of a device and at least one of a blocking starting time, a blocking cancelling time, the number of blocking, and a monitoring cancelling time. The LBL (321) may be a part of the GBL (302) described in FIG. 3A or have a part of the GBL (302) described in FIG. 3A.

With reference now to FIG. 4A, FIG. 4A illustrates one embodiment of the flowchart of the process mentioned above, in which a detection of each improper device is used as a trigger of updating the GBL and then each trigger is used for transfer the GBL or an identifier(s) in the GBL.

In step 401, the server computer starts the process mentioned above.

In step 402, in response to a detection of an improper device, the server computer adds, into a blacklist, information on a position of the improper device or information on a position associated with a position of the improper device, and an ID of the improper device. The blacklist may further comprise a time when blocking of communication from or to the improper device is cancelled (i.e., a blocking cancelling time), a time when monitoring of the improper device is cancelled (i.e., a monitoring cancelling time), or a combination thereof. The blacklist may be stored in a storage to which the server computer may access.

In step 403, the server computer transfers the blacklist or an ID or IDs, present in the blacklist, respectively, of one or more devices associated with the information on the position of the improper device to one or more relay devices which exist in or near the position of the improper device and/or to one or more relay devices which exist in or near the position associated with the position of the improper device.

Further, the server computer may transfer a time, present in the blacklist, when blocking of communication from or to the improper device is cancelled, a time, present in the blacklist, when monitoring of the improper device is cancelled, or a combination thereof.

The identifier or identifiers, present in the blacklist, respectively, of one or more devices associated with the information on the position of the improper device may be identifier or identifiers of the one or more improper devices which are specified from information associated with the position of the improper device.

The information on the position associated with the position of the improper device may be information on a position of a relay device which relays data transferred from the improper device, information on a position of a base station which the relay device is connected to, information on a position of an access point which the relay device is connected to, or a combination thereof. The combination may be, for example, but not limited to, an average of at least two of information on a position of a relay device which relays data transferred from the improper device, information on a position of a base station which the relay device is connected to, and information on a position of an access point which the relay device is connected to.

In a case where the improper device is an IoT device, the information on the position associated with the position of the improper device may be information on a position of a relay device to which relays data transferred from the IoT device, information on a position of a base station to which this relay device is connected, or information on a position of an access point which this relay device is connected to.

In step 404, the server computer waits for a lapse of the blocking cancelling time, while blocking data if any from the improper device. Alternatively, the server computer may wait for a lapse of the blocking cancelling times and, forwarding data if any from a true device associated with the improper device if any, while blocking data if any from the improper device. The server computer proceeds to step 408. The server computer optionally proceeds to step 405 before proceeding to step 408, in order to reduce the effect by repeated accesses from same improper devices.

In an optional step 405, the server computer may wait for a trigger for step 406, enabling forwarding data sent from the improper device by unblocking the data. Examples of the trigger include lapse of the monitoring cancelling time, predefined number or volume of successful data forwarding from the improper device, and the intervention of the operator allowing the forwarding of the data from the improper device.

In step 406 conditionally followed by optional step 405, the server computer may judge whether the device once identified as improper is now working normally or not. If the judgment is positive, the server computer proceeds to step 408. Meanwhile, if the judgment is negative, the server computer proceeds to step 407.

In step 407 conditionally followed by optional step 405, the server computer may update the GBL using information obtained in step 406 which relates to the positive judgment.

In step 408, the server deletes a description on the improper device from the blacklist. Accordingly, the blacklist can be managed in terms of the monitoring cancelling time.

In step 409, the server computer terminates the process mentioned above.

In steps described in FIG. 4A, steps 405 and 406 can be omitted. Accordingly, in a case where steps 405 and 406 are omitted, the server computer may proceed to step 408 after step 404.

With reference now to FIG. 4B, FIG. 4B illustrates another embodiment of the flowchart described in FIG. 4A.

In FIG. 4B, step 404 described in FIG. 4A is replaced with step 404' as an alternative step.

In step 404', the server computer may judge whether improper activities of the improper device is reported again before a lapse of the blocking cancelling time. If the judgment is positive, the server computer proceeds to step 410. Meanwhile, if the judgment is negative, the server computer proceeds to optional step 405, or directly to step 408.

In step 410, the server computer may update the GBL using information obtained in step 406 which relates to the positive judgment.

With reference now to FIG. 4C, FIG. 4C illustrates another embodiment of a flowchart of the process mentioned above, in which an improper device is a true device but is unstable or has a malfunction.

In step 411, the server computer starts the process mentioned above.

Steps 412 and 413 correspond to steps 402 and 403 described in FIG. 4A, respectively. Accordingly, the overlapping explanations of steps 412 and 413 will be omitted here.

In step 414, the server computer waits for a lapse of the blocking cancelling time, while blocking data if any from the unstable or malfunction device. The server computer proceeds to optional step 415 or to step 418 directly.

In an optional step 415, the server computer may wait for a predetermined times successful data forwarding for the device once identified as improper, enabling forwarding data sent from the improper device by unblocking the data. Alternatively, the server computer may wait for a predefined period of a timeout, and enabling forwarding data sent from the improper device after the predefined period.

In step 416 followed by the optional step 415, the server computer may judge whether the device once identified as improper is now working normally or not. If the judgment is positive, the server computer proceeds to step 418. Meanwhile, if the judgment is negative, the server computer proceeds to step 417.

In step 417 followed by the optional step 416, the server computer may update the GBL using information obtained in step 416 which relates to the positive judgment.

In step 418, the server deletes a description on the improper device from the blacklist. Accordingly, the blacklist can be managed in terms of the monitoring cancelling time.

In step 419, the server computer terminates the process mentioned above.

In steps described in FIG. 4C, steps 415 and 416 can be omitted. Accordingly, in a case where steps 415 and 416 are omitted, the server computer may proceed to step 418 after step 414.

Figure 4D:
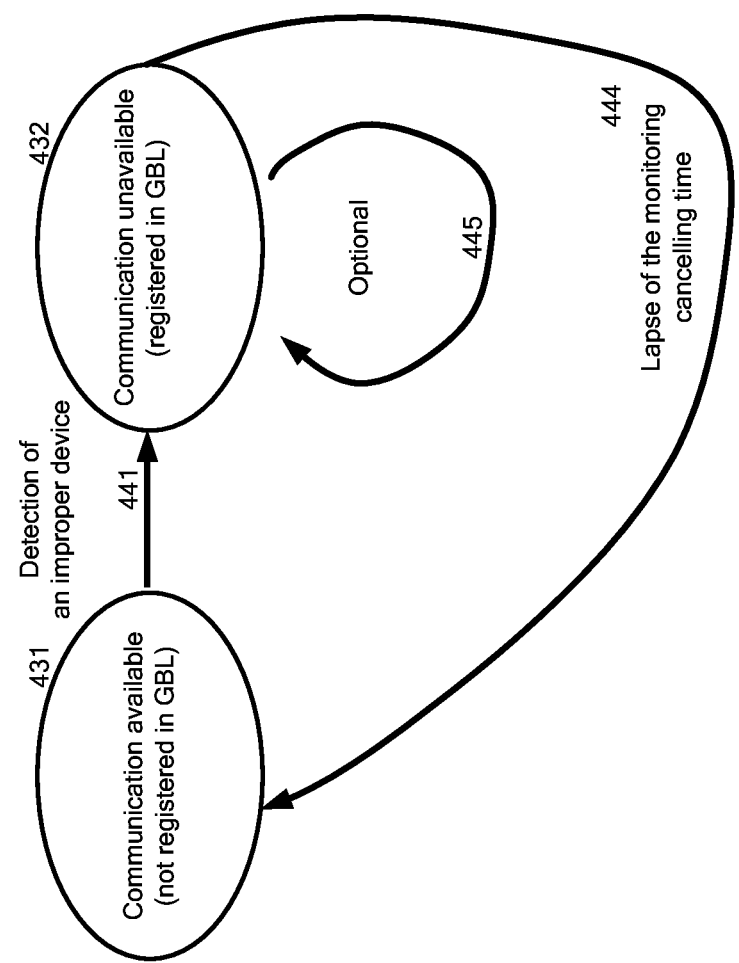
FIG. 4D illustrates a state change diagram according to the embodiments described in FIGS. 4A to 4C.
Figure 4E:
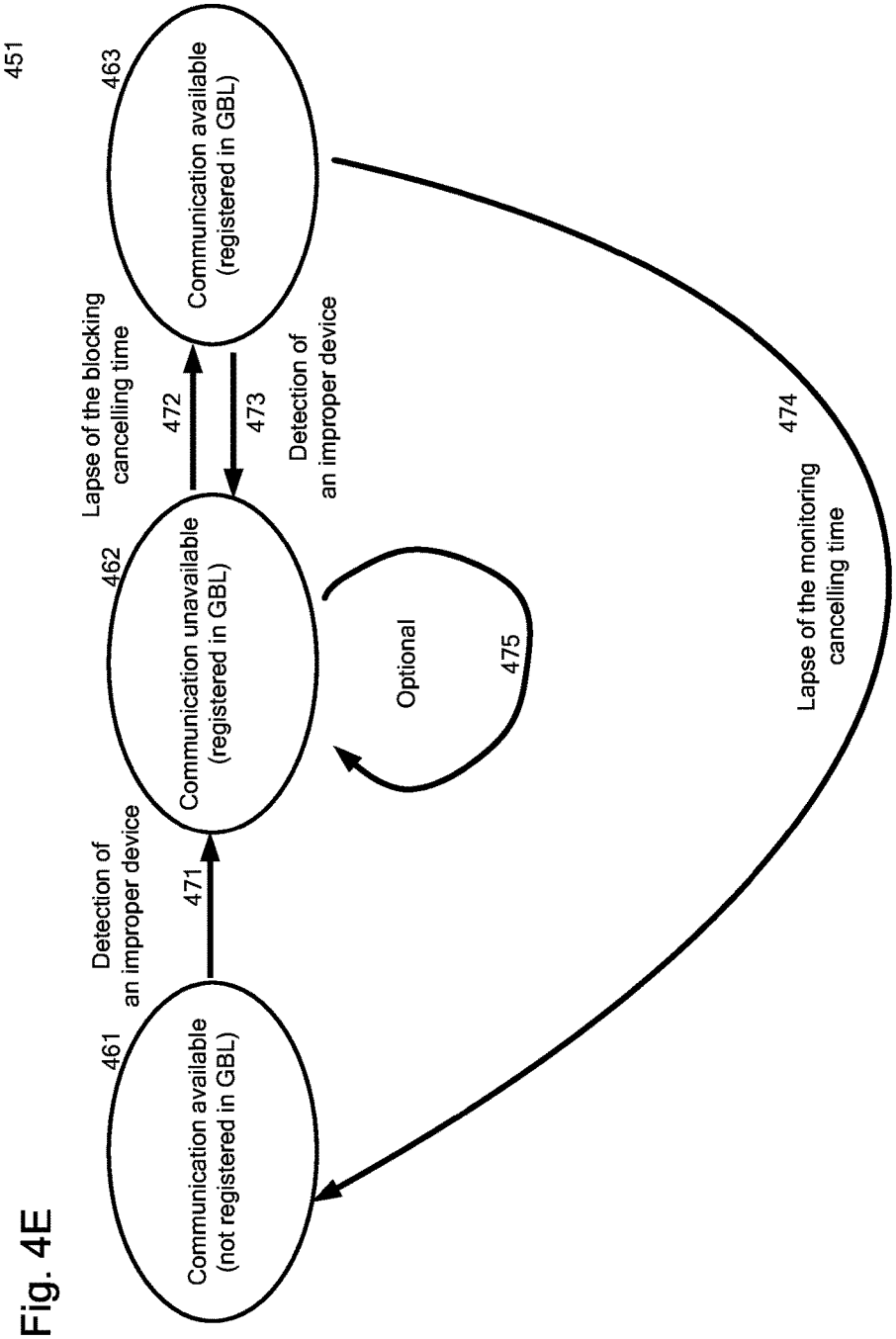
FIG. 4E illustrates another embodiment of a state change diagram according to the embodiment described in FIGS. 4A to 4C.

FIGS. 4D and 4E illustrate embodiments of a state change diagram according to the embodiment described in FIGS. 4A to 4C.

With reference now to FIG. 4D, FIG. 4D illustrates one embodiment of a state change diagram.

The state (431) shows that communication between a device and a relay device is available, because an ID of the device is not registered in the GBL.

In a case where the device is detected as an improper device (441) and then the ID of the device is registered in the GBL, the state (431) transitions to the state (432).

The state (432) shows that the communication between the device and the relay device is unavailable, because the ID of the device is registered in the GBL.

In a case where the monitoring cancelling time is lapsed (444), the state (432) transitions to the state (431).

Optionally, in a case where the device is detected as an improper device during the state (432) of the blocking of the communication between the device and the relay device (445), the blocking cancelling time and/or the monitoring cancelling time may be postponed as a penalty.

With reference now to FIG. 4E, FIG. 4E illustrates another embodiment of a state change diagram.

The state (461) shows that communication between a device and a relay device is available, because an ID of the device is not registered in the GBL.

In a case where the device is detected as an improper device (471) and then the ID of the device is registered in the GBL, the state (461) transitions to the state (462).

The state (462) shows that the communication between the device and the relay device is unavailable, because the ID of the device is registered in the GBL.

In a case where the time when the blocking cancelling time is lapsed (472), the state (462) transitions to the state (463).

The state (463) shows that the communication between the device and the relay device is available, because the time when blocking of communication from or to the improper device is cancelled, even though the ID of the device is registered in the GBL.

In a case where the device is detected as an improper device (473) again, the state (463) transitions back to the state (462). The effects for the re-detection may be, for example but not limited to, a postponement of the blocking cancelling time, a postponement of the monitoring cancelling time, an increase of the number of a penalty or combinations of those. The more re-detected, the more postponed of these cancelling times.

In a case where the monitoring cancelling time is lapsed (474), the state (463) transitions to the state (461).

Optionally, in a case where the device is detected as an improper device again during the state (462) of the blocking of the communication between the device and the relay device (475), the blocking cancelling time and/or the monitoring cancelling time may be postponed as a penalty.

Figure 5B:
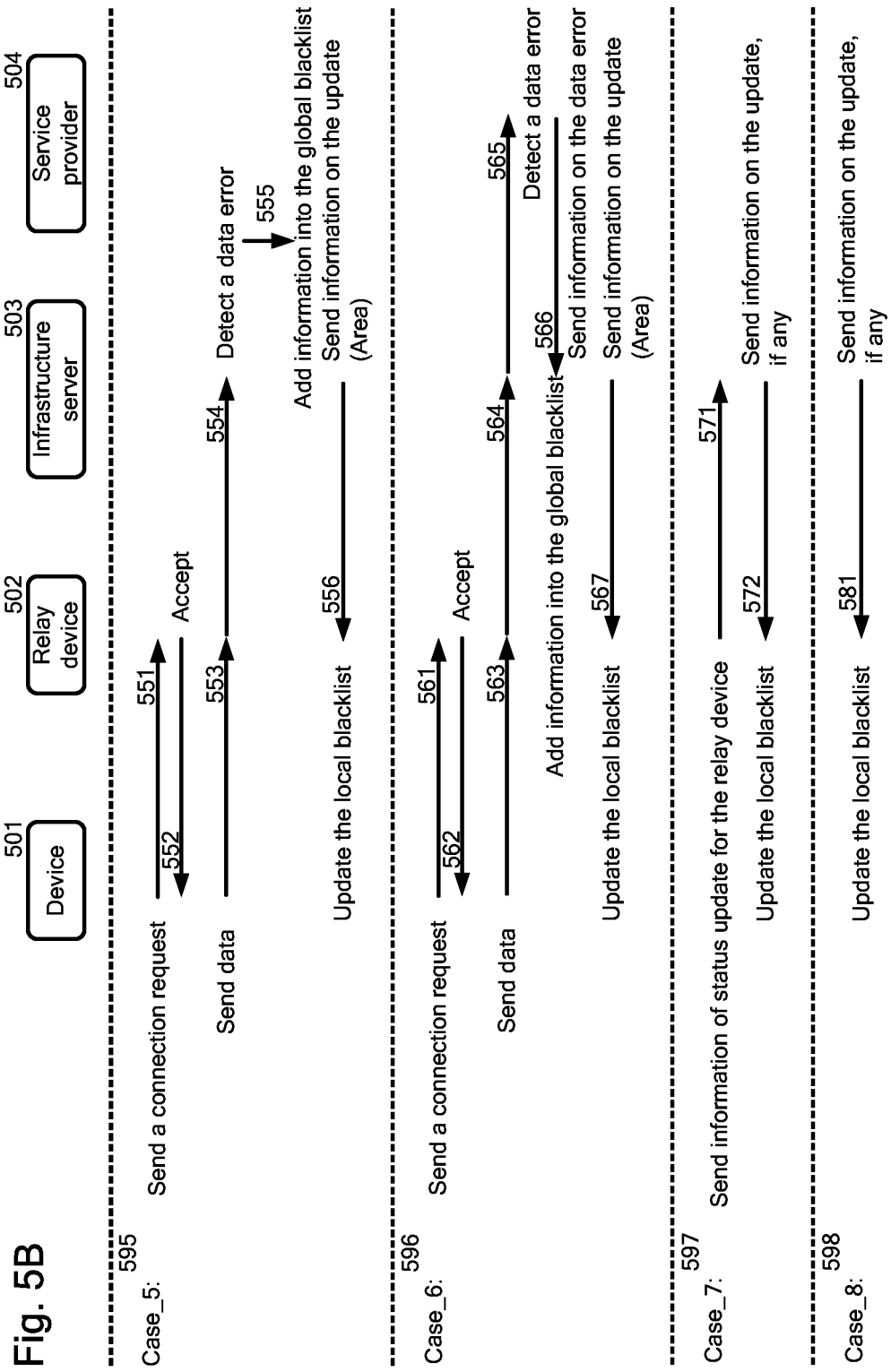

With reference now to FIGS. 5A and 5B, FIGS. 5A and 5B illustrate embodiments of patterns of managing a blacklist used for controlling commutation from the improper device and, if necessary, detecting an improper device prior to the management.

Each of FIGS. 5A and 5B shows a device (501), a relay device (502), an infrastructure server (503) and a service provider (504). The device (501), the relay device (502), the infrastructure server (503) and the service provider (504) correspond to the devices (241 to 244), the relay devices (251 to 256), the infrastructure server (211) and the service provider (221), respectively. Accordingly, the explanations of the devices (241 to 244), the relay devices (251 to 256), the infrastructure server (211) and the service provider (221) can be applied here.

The infrastructure server (503) manages the blacklist, i.e. the GBL.

The relay device (502) manages a blacklist which is called as a local blacklist (hereinafter referred also to as "LBL").

Case_1 (591): in a case where the device is normal, or normal case

In step 511, the device (501) sends a request for a connection to the relay device (502) via a wireless network. In response to receipt of the request, the relay device (502) judges whether the request is acceptable or not.

In step 512, the relay device (502) sends an acknowledgement of the connection if the request is acceptable.

In step 513, the device (501) sends data to the relay device (502) via the wireless network. In response to receipt of the data, the relay device (502) judges whether the request is acceptable or not by referring to the LBL and then forwards the data to the infrastructure server (503) if the LBL does not have the ID of the device (501). In response to receipt of data, the infrastructure server (503) judges whether the request is acceptable or not by referring to the GBL, and then forwards the data to the service provider (504) if the GBL does not have the ID of the device (501). The device (501) may repeat the sending of data to the relay device (502).

In step 514, the device (501) sends a request for a disconnection to the relay device (502) via the wireless network.

In step 515, the relay device (502) sends an acknowledgement of the disconnection.

Case_2 (592): in a case where an improper device (501) is detected on the relay device (502).

In step 521, the device (501) sends a request for a connection to the relay device (502) via a wireless network. In response to receipt of the request, the relay device (502) judges whether the request is acceptable or not. The relay device (502) finds that the LBL has the ID of the device (501). Accordingly, the relay device (502) judges that the request is unacceptable and that the device (501) is improper.

Steps 522 and 523 are optional. In a case where there is a mechanism for postponing a blocking cancelling time or a monitoring cancelling time by a notification from a plurality of devices, steps 522 and 523 can be omitted.

In step 522, the relay device (502) makes a blacklist report and then sends the blacklist report to the infrastructure server (503). In response to receipt of the blacklist report, the infrastructure server (503) confirms that the GBL has the ID of the device (501) and updates the GBL using the blacklist report.

In step 523, the infrastructure server (503) transfers the information on the update to one or more relay devices including the relay device (502) which exist in or near the position of the improper device (501) and/or to one or more relay devices including the relay device (502) which exist in or near the position associated with the position of the improper device (501). The information on the update may be the GBL itself, an ID or IDs, present in the GBL, or a subset of GBL or IDs, respectively, of one or more devices associated with the information on the position of the improper device (501). For, example, the information on the update may comprise a position of the device (501) or relay device (502), and an ID of the device (501).

In response to receipt of the information on the update, each of relay devices including the relay device (502) updates the LBL, using the information on the update.

Case_3 (593): in a case where an improper device (501) and a protocol error are detected on the relay device (502).

In step 531, the device (501) sends a request for a connection to the relay device (502) via a wireless network. In response to receipt of the request, the relay device (502) judges whether the request is acceptable or not.

In step 532, the relay device (502) sends an acknowledgement of the connection if the request is acceptable.

In step 533, the device (501) sends data to the relay device (502) via the wireless network. In response to receipt of the data, the relay device (502) finds a protocol error. An example of the protocol error may comprise, for example, but not limited to, continuously sending the request for a connection. The protocol error happens in a case where the device (501) may be malicious, may be with insufficient power supply or in a low battery condition, or may be unstable or malfunction due to a software or hardware error.

In step 534, the relay device (502) makes a blacklist report and then sends to the infrastructure server (503). In response to receipt of the blacklist report, the infrastructure server (503) adds information on the improper device (501) to the GBL in order to update the GBL, if the information on the device is not registered in the GBL, or modifies information on improper device (501) on GBL with an new blocking starting time, a postponed blocking cancelling time and/or a postponed monitoring cancelling time, if the information on the device is already registered for monitoring, but not for blocking, in the GBL.

In step 535, the infrastructure server (503) transfers the information on the update to one or more relay devices including the relay device (502) which exist in or near the position of the improper device (501) and/or to one or more relay devices including the relay device (502) which exist in or near the position associated with the position of the improper device (501). The information on the update may be the GBL itself or an ID or IDs, present in the GBL, or a subset of GBL or IDs, respectively, of one or more devices associated with the information on the position of the improper device (501).

In response to receipt of the information on the update, each of relay devices including the relay device (502) updates the LBL, using the information on the update.

Case_4 (594): in a case where an improper device (501) is detected on the infrastructure server (503).

In step 541, the device (501) sends a request for a connection to the relay device (502) via a wireless network. In response to receipt of the request, the relay device (502) judges whether the request is acceptable or not.

In step 542, the relay device (502) sends an acknowledgement of the connection if the request is acceptable.

In step 543, the device (501) sends data to the relay device (502) via the wireless network. In response to receipt of the data, the relay device (502) judges whether or not the request is acceptable by referring to the LBL In step 544, the relay device (502) forwards the data to the infrastructure server (503) if the LBL does not have the ID of the device (501). In response to receipt of data, the infrastructure server (503) judges whether or not the request is acceptable by referring to the GBL. The infrastructure server (503) finds that the GBL has the ID of the device (501). Accordingly, the infrastructure server (503) judges that the data is not transferred to the service provider (504). Optionally, the infrastructure server (503) may update the GBL about the device (501) by postponing blocking cancelling time and the monitoring cancelling time.

In step 545, the infrastructure server (503) transfers the information on the update to one or more relay devices including the relay device (502) which exist in or near the position of the improper device (501) and/or to one or more relay devices including the relay device (502) which exist in or near the position associated with the position of the improper device (501). The information on the update may be the GBL itself, an ID or IDs, present in the GBL, or a subset of GBL or IDs, respectively, of one or more devices associated with the information on the position of the improper device (501).

In response to receipt of the information on the update, each of relay devices including the relay device (502) updates the LBL, using the information on the update.

Case_5 (595): in a case where an improper device (501) and a protocol error are detected on the infrastructure server (503).

In step 551, the device (501) sends a request for a connection to the relay device (502) via a wireless network. In response to receipt of the request, the relay device (502) judges whether the request is acceptable or not.

In step 552, the relay device (502) sends an acknowledgement of the connection if the request is acceptable.

In step 553, the device (501) sends data to the relay device (502) via the wireless network. In response to receipt of the data, the relay device (502) judges whether or not the request is acceptable by referring to the LBL.

In step 554, the relay device (502) then forwards the data to the infrastructure server (503) if the LBL does not have the ID of the device (501). In response to receipt of data, the infrastructure server (503) finds a data error. The data error may be, for example, but not limited to, a data format error, a destination error of a service provider, or unexpected destination of a service provider.

In step 555, the infrastructure server (503) makes a blacklist report and then adds the information on the improper device (501) to the GBL in order to update the GBL, if the information on the device is not registered in the GBL or modifies information on improper device (501) on GBL with an new blocking starting time, a postponed blocking cancelling time and/or a postponed monitoring cancelling time, if the information on the device is already registered for monitoring, but not for blocking, in the GBL.

In step 556, the infrastructure server (503) transfers the information on the update to one or more relay devices including the relay device (502) which exist in or near the position of the improper device (501) and/or to one or more relay devices including the relay device (502) which exist in or near the position associated with the position of the improper device (501). The information on the update may be the GBL itself, an ID or IDs, present in the GBL, or a subset of GBL or IDs, respectively, of one or more devices associated with the information on the position of the improper device (501).

In response to receipt of the information on the update, each of relay devices including the relay device (502) updates the LBL, using the information on the update.

Case_6 (596): in a case where an improper device (501) and a data error are detected on the service provider (504).

In step 561, the device (501) sends a request for a connection to the relay device (502) via a wireless network. In response to receipt of the request, the relay device (502) judges whether the request is acceptable or not.

In step 562, the relay device (502) sends an acknowledgement of the connection if the request is acceptable.

In step 563, the device (501) sends data to the relay device (502) via the wireless network. In response to receipt of the data, the relay device (502) judges whether or not the request is acceptable by referring to the LBL.

In step 564, the relay device (502) forwards the data to the infrastructure server (503) if the LBL does not have the ID of the device (501). In response to receipt of data, the infrastructure server (503) judges whether or not the request is acceptable by referring to the GBL.

In step 565, the infrastructure server (503) forwards the data to the service provider (504) if the GBL does not have the ID of the device (501). In response to receipt of data, the service provider (504) finds a data error.

In step 566, the infrastructure server (503) makes information on the data error and then transfers the information to the infrastructure server (503). In receipt of the information, the infrastructure server (503) adds information on the improper device to the GBL in order to update the GBL, and further makes information on the update, based on the information on the data error.

In step 567, the infrastructure server (503) transfers the information on the update to one or more relay devices including the relay device (502) which exist in or near the position of the improper device (501) and/or to one or more relay devices including the relay device (502) which exist in or near the position associated with the position of the improper device (501). The information on the update may be the GBL itself, an ID or IDs, present in the GBL, or a subset of GBL or IDs, respectively, of one or more devices associated with the information on the position of the improper device (501).

In response to receipt of the information on the update, each of relay devices including the relay device (502) updates the LBL, using the information on the update.

Case_7 (597): in a case where an improper device (501) moves and changes its position.

In step 571, the relay device (502) sends information on status update for the relay device (502) to the infrastructure server (503). The information on states update for the relay device (502) may relate to a heartbeat of the relay device (502, indicating the relay device (502) is actively providing an IoT relay service. The information on status update is required for receiving a blacklist or an identifier or identifiers, present in the blacklist, respectively, of one or more devices associated with the information on the position of the improper device (501) to one or more relay devices which exist in or near the position of the improper device (501) and/or to one or more relay devices which exist in or near the position associated with the position of the improper device (501). Further, in a case where the relay device (502) is powered off or powered on, terminating or starting the IoT mode, the information on status update is deleted or generated. The status update may include, for example, but not limited to, a present position of the relay device (502), a status of the relay device (502) and an ID of the relay device (502). The status of the relay device (502) may include, for example, but not limited to, an IoT mode being active or inactive. The IoT mode refers to a function that a relay device can forward data which was sent from the device (501) to the infrastructure server (503). In a case where the IoT mode is active on the relay device (502), the relay device (502) can communicate with the device (501) and forward the data to the infrastructure server (503). Meanwhile, in a case where the IoT mode is inactive, the relay device (502) can communicate with the device (501) but cannot forward the data to the infrastructure server (503).

In response to receipt of the status update, the infrastructure server (503) may update the GBL. In response to the update, the infrastructure server (503) makes information on the update.

In step 572, the infrastructure server (503) transfers the information on the update to one or more relay devices including the relay device (502) which exist in or near the position of the improper device (501) and/or to one or more relay devices including the relay device (502) which exist in or near the position associated with the position of the improper device (501). The information on the update may be the GBL itself or an ID or IDs, present in the GBL, or a subset of GBL or IDs, respectively, of one or more devices associated with the information on the position of the improper device (501).

In response to receipt of the information on the update, each of relay devices including the relay device (502) updates the LBL, using the information on the update.

Case_8 (598): in a case where the LBL is updated.

Let us suppose that the improper device (501) moves and, accordingly, the position of the device (501) is changed or that the improper device (501) is powered on and, accordingly, the position of the device (501) is newly detected.

In step 581, the infrastructure server (503) transfers the information on the update, if any, to one or more relay devices including the relay device (502) which exist in or near the position, after moving, of the improper device (501) and/or to one or more relay devices including the relay device (502) which exist in or near the position associated with the position, after moving, of the improper device (501).

In response to receipt of the information on the update, each of relay devices including the relay device (502) updates the LBL, using the information on the update.

FIGS. 6A to 6F illustrate flowcharts of a process for managing, by a server computer which can communicate with a device via a relay device, a blacklist used for controlling commutation from or to an improper device, or the GBL, according to Cases_1 to 8 described in FIGS. 5A and 5B.

In this embodiment, an example of devices being IoT devices is described. However, this embodiment can be applied also to devices other than IoT devices, such as card devices, smartphones, mobile phones, tablets or notebook computers.

With reference now to FIG. 6A, FIG. 6A illustrates an embodiment of a process for blocking data whose destination is the service provider (504).

In step 601, the infrastructure server (503) starts the process mentioned above.

In step 602, the infrastructure server (503) prepares an global black list (i.e. a GBL) and then initialize it to prepare an empty GBL, and further prepares a global device list (i.e. a GDL) for relay devices each of whose IoT mode is active and then initialize it to prepare an empty GDL. The infrastructure server (503) manages the GBL and GDL.

In step 603, the infrastructure server (503) judges whether data whose destination is the service provider (504) is received from the relay device (502) or not. The data was originally sent from the device (501) to the relay device (502) and then forwarded from the relay device (502) to the infrastructure server (503). The data may comprise, for example, but not limited to, actual data, a destination of the data, position of the device (501) or relay device (502), an ID of the device (501), and an ID of the relay device(502). If the judgment is positive, the infrastructure server (503) proceeds to step 604 (this is applied for Cases_1 and 4 to 6 (591, 594 to 596)). Meanwhile, if the judgment is negative, infrastructure server (503) proceeds to step 605.

In step 604, the infrastructure server (503) performs a process for the received data. The detailed explanation of this process will be explained by referring to FIG. 6B.

In step 605, the infrastructure server (503) judges whether information on the update done in the LBL is received from the relay device (502) or not. If the judgment is positive, the infrastructure server (503) proceeds to step 606 (this is applied for Cases_2 and 3 (592 and 593)). Meanwhile, if the judgment is negative, the infrastructure server (503) proceeds to step 607.

In step 606, the infrastructure server (503) performs a process for the information on the LBL update. The detailed explanation of this process will be explained by referring to FIG. 6 C.

In step 607, the infrastructure server (503) judges whether information on the update done in the LBL is received from the relay device (502) or not. If the judgment is positive, the infrastructure server (503) proceeds to step 608 (this is applied for Case 7 (597)). Meanwhile, if the judgment is negative, the infrastructure server (503) proceeds to step 609.

In step 608, the infrastructure server (503) performs a process for the information on status update. The detailed explanation of this process will be explained by referring to FIG. 6 D.

In step 609, the infrastructure server (503) judges whether a request for terminating an IoT relay service is received or not. If the judgment is positive, the infrastructure server (503) proceeds to a final step 610. Meanwhile, if the judgment is negative, the infrastructure server (503) proceeds back to step 603.

In step 610, the infrastructure server (503) terminates the process mentioned above.

With reference now to FIG. 6B, FIG. 6B illustrates an embodiment of a process for the received data.

In step 611, the infrastructure server (503) starts the process mentioned above. This is applied for Cases_1 and 4 to 6 (591, and 594 to 596).

In step 611, the infrastructure server (503) stores, into a storage, the received data whose destination is the service provider (504) and which was sent from the relay device (502). As stated in the above-mentioned step 603, the data may comprise, for example, but not limited to, actual data, a destination of the data, position of the device (501) or relay device (502), an ID of the device (501), and an ID of the relay device (502).

In step 613, the infrastructure server (503) updates the GDL, based on the received data.

In step 614, the infrastructure server (503) judges whether an ID of the device in the received data exists in the GBL and a period is in a blocking of the data, i.e. in a period between the blocking starting time and the blocking cancelling time or not. If the judgment is positive, the infrastructure server (503) proceeds to step 615 (this is applied for Case_4 (594)). Meanwhile, if the judgment is negative, the infrastructure server (503) proceeds to step 616.

In step 614, the infrastructure server (503) disregards the data without transferring the data to the service provider (504)

In step 615, the infrastructure server (503) judges whether a data error is detected or not. If the judgment is positive, the infrastructure server (503) proceeds to step 615 (this is applied for Case_5 (595)). Meanwhile, if the judgment is negative, the infrastructure server (503) proceeds to step 617.

In step 617, the infrastructure server (503) forwards the data to the service provider (504).

In step 618, the infrastructure server (503) judges whether information on the data error is receive from the service provider or not. If the judgment is positive, the infrastructure server (503) proceeds to step 619 (this is applied for Case_6 (596)). Meanwhile, if the judgment is negative, the infrastructure server (503) proceeds to a final step 620.

In step 619, the infrastructure server (503) updates the GBL, based on the information on the improper device to the GBL. The detailed explanation of updating the GBL will be explained by referring to FIG. 6F. Further, the infrastructure server (503) makes information on the update, based on the information on the data error, and then transfers the information on the update to one or more relay devices including the relay device (502) which exist in or near the position of the device (501) and/or to one or more relay devices including the relay device (502) which exist in or near the position associated with the position of the device (501).

In step 620, the infrastructure server (503) terminates the process mentioned above.

Figure 6C:
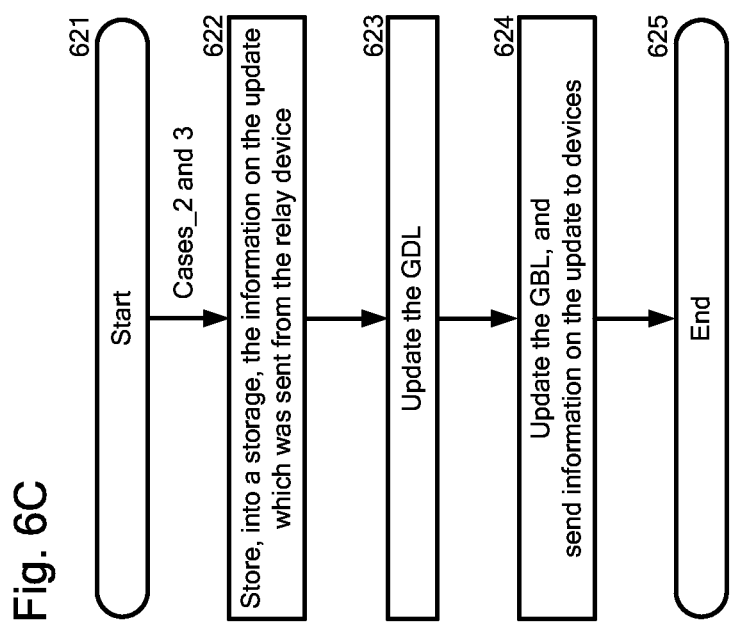

With reference now to FIG. 6C, FIG. 6C illustrates an embodiment of a process for the information on the update.

In step 621, the infrastructure server (503) starts the process mentioned above. This is applied for Cases_2 and 3 (592 and 593).

In step 622, the infrastructure server (503) stores the information on the update which was sent from the relay device (502). The information on the update may comprise, for example, but not limited to, a position of the device (501) or relay device (502), an ID of the device (501), and an ID of the relay device (502).

In step 623, the infrastructure server (503) updates the GDL, based on the information on the update. The detailed explanation of updating the GDL will be explained by referring to FIG. 6E.

In step 624, the infrastructure server (503) updates the GBL, based on the information of the update. The detailed explanation of updating the GBL will be explained by referring to FIG. 6F. Further, the infrastructure server (503) transfers the information on the update to one or more relay devices including the relay device (502) which exist in or near the position of the device (501) and/or to one or more relay devices including the relay device (502) which exist in or near the position associated with the position of the device (501).

In step 625, the infrastructure server (503) terminates the process mentioned above.

Figure 6D:
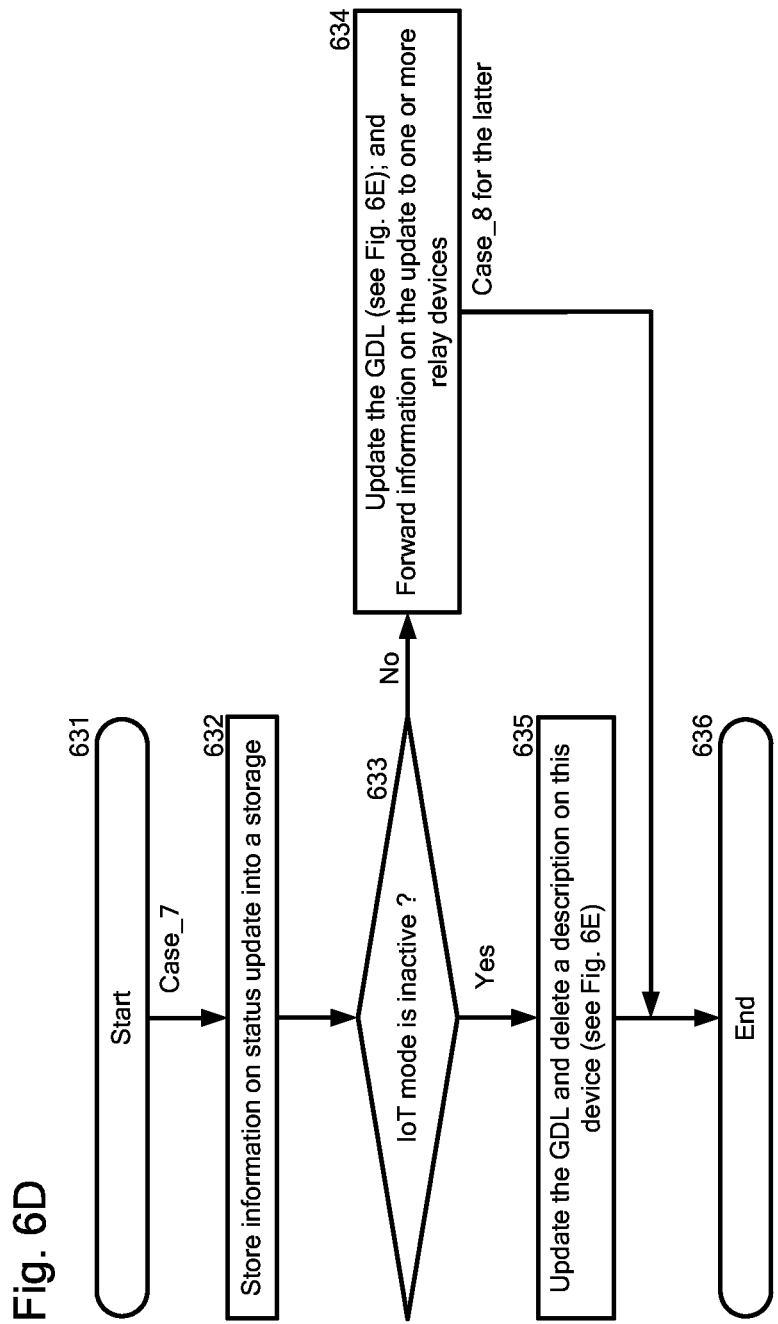

With reference now to FIG. 6D, FIG. 6D illustrates an embodiment of a process for the information on status update.

In step 631, the infrastructure server (503) starts the process mentioned above. This is applied for Case_7 (597).

In step 632, the infrastructure server (503) stores, into a storage, the information on status update for the device (501).

In step 633, the infrastructure server (503) judges whether an IoT mode for the relay device (502) is inactive or not. If the judgment is positive, the infrastructure server (503) proceeds to step 635. Meanwhile, if the judgment is negative, the infrastructure server (503) proceeds to step 634.

In step 634, the infrastructure server (503) updates the GDL, based on the information on status update. The detailed explanation of this process will be explained by referring to FIG. 6E.

Further, the infrastructure server (503) transfers the information on the update, if any, to one or more relay devices including the relay device (502) which exist in or near the position, after moving, of the device (501) and/or to one or more relay devices including the relay device (502) which exist in or near the position associated with the position, after moving, of the device (501). This is applied for Case_8 (598).

In step 635, the infrastructure server (503) updates the GBL, using the information on the update, and further deletes a description on the device (501) from the GDL.

In step 636, the infrastructure server (503) terminates the process mentioned above.

Figure 6E:
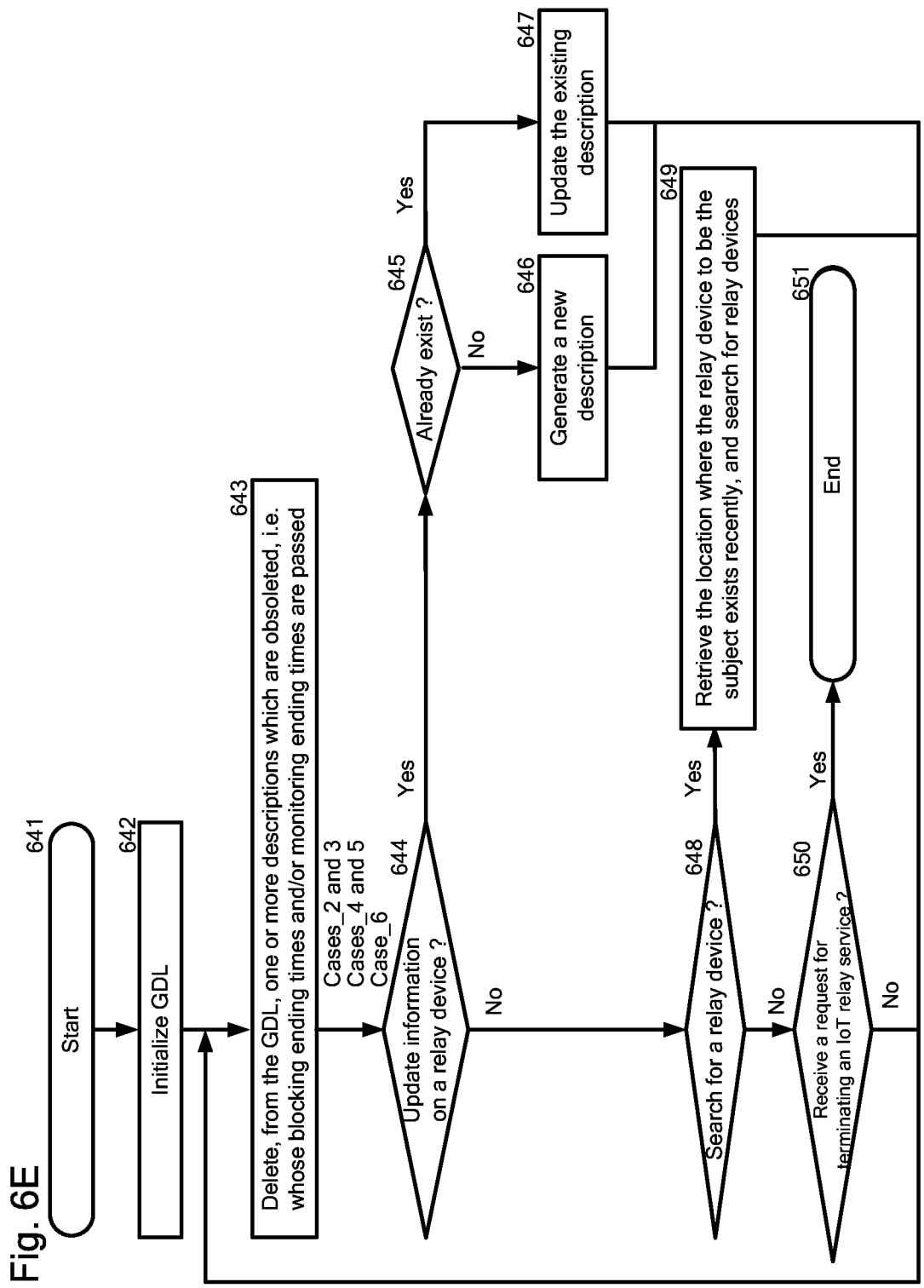

With reference now to FIG. 6E, FIG. 6E illustrates an embodiment of a process for update the GDL on the infrastructure server (503).

In step 641, the infrastructure server (503) starts the process mentioned above.

In step 642, the infrastructure server (503) initializes the GDL to prepare an empty GDL. An embodiment of the GDL is illustrated in FIG. 3B, as explained above.

In step 643, the infrastructure server (503) deletes, from the GDL, one or more descriptions which are obsolete, i.e. whose last communication time is old enough (for example, one or more descriptions whose relay device is inactive for a predefined period such as for thirty minutes). For example, the descriptions two hours after the latest communication are deleted. This is applied for Cases_2 and 3, Cases_4 and 5 and Case_6 (592, 593, 594, 595 and 596).

In step 644, the infrastructure server (503) judges whether information on the relay device (502) to a subject is updated in the GDL or not. If the judgment is positive, the infrastructure server (503) proceeds to step 645. Meanwhile, if the judgment is negative, the infrastructure server (503) proceeds to step 648.

In step 645, the infrastructure server (503) judges whether the ID of the relay device (502) to be a subject already exists in the GDL or not. If the judgment is positive, the infrastructure server (503) proceeds to step 647. Meanwhile, if the judgment is negative, the infrastructure server (503) proceeds to step 646.

In step 646, the infrastructure server (503) generates a new description on the relay device (502) and then adds the new description into the GDL. The new description may include, for example but not limited to, an ID of the relay device (502), information on a position of the relay device (502), and latest communication time for the relay device (502).

In step 647, the infrastructure server (503) updates the existing description on the relay device (502). The description on information on a position of the relay device (502) and latest communication time for the relay device (502) are updated in the GDL.

In step 648, the infrastructure server (503) judges whether searching for one or more relay devices which are closer to the relay device (502) to be a subject or not. If the judgment is positive, the infrastructure server (503) proceeds to step 649. Meanwhile, if the judgment is negative, the infrastructure server (503) proceeds to step 650.

In step 649, the infrastructure server (503) retrieves, from the GDL, the position where the relay device (502) to be the subject exists recently and then searches for one or more devices which exists the position closer to the retrieved position.

In step 650, the infrastructure server (503) judges whether a request for terminating an IoT relay service is received or not. If the judgment is positive, the infrastructure server (503) proceeds to a final step 651. Meanwhile, if the judgment is negative, the infrastructure server (503) proceeds back to step 643.

In step 651, the infrastructure server (503) terminates the process mentioned above.

Figure 6F:
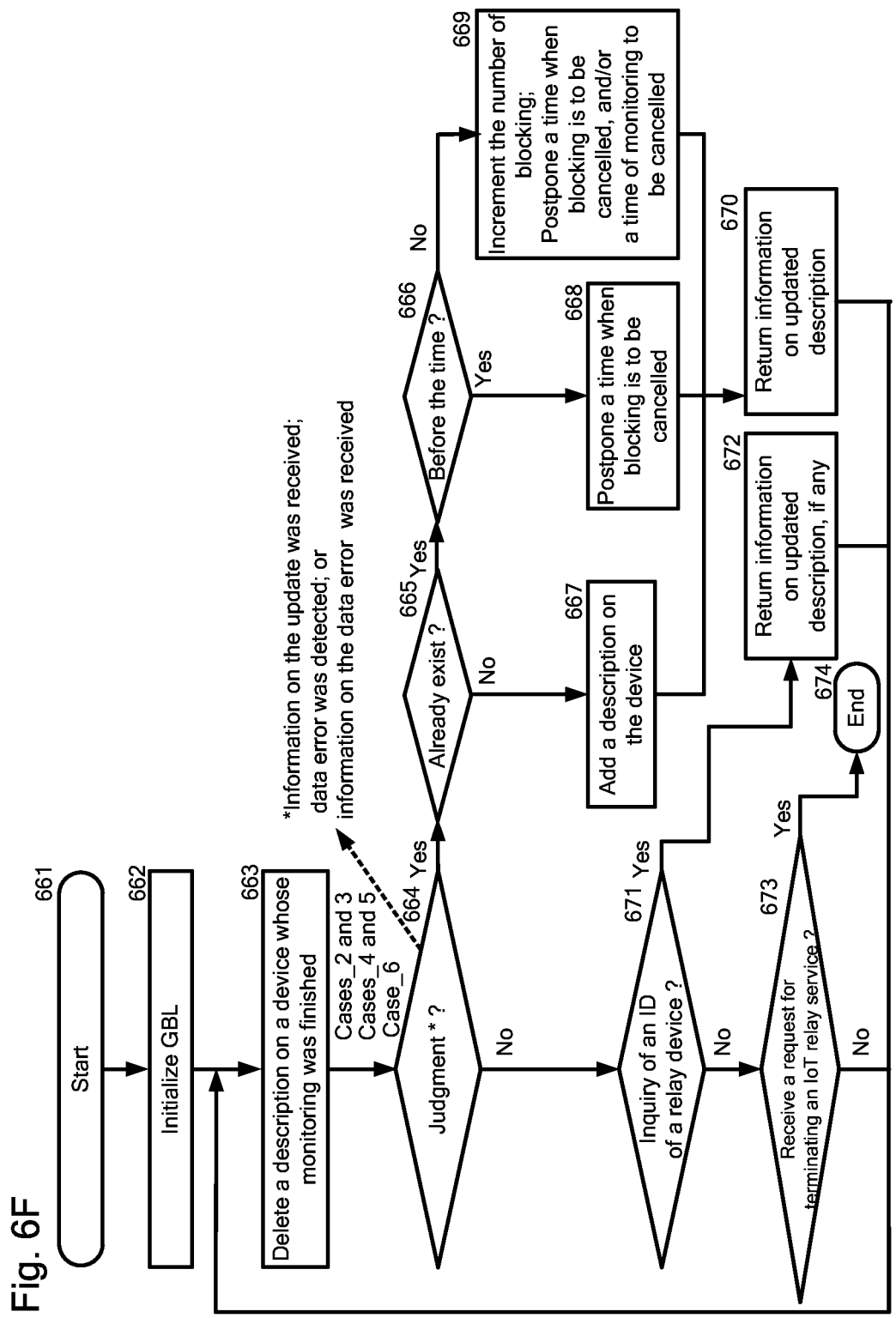

With reference now to FIG. 6F, FIG. 6F illustrates an embodiment of a process for update the GBL on the infrastructure server (503).

In step 661, the infrastructure server (503) starts the process mentioned above.

In step 662, the infrastructure server (503) initializes the GBL to prepare an empty GBL. An embodiment of the GBL is illustrated in FIG. 3A, as explained above.

In step 663, the infrastructure server (503) deletes, from the GBL, a description on a device whose monitoring was finished. That is its blocking cancelling time together with monitoring cancelling time or its monitoring cancelling time, if present, are elapsed In step 664, the infrastructure server (503) judges whether or not
  information on the update which was sent was from the relay device (502) or from the service provider (504) was received on the infrastructure server (503); or
  data error was detected on the infrastructure server (503); or
  information on the data error which was sent from the service provider (504) was received on the infrastructure server (503). If the judgment is positive, the infrastructure server (503) proceeds to step 665. Meanwhile, if the judgment is negative, the infrastructure server (503) proceeds to step 671.

In step 665, the infrastructure server (503) judges whether the ID of the relay device (502) to be a subject already exists in the GBL or not. If the judgment is positive, the infrastructure server (503) proceeds to step 666. Meanwhile, if the judgment is negative, the infrastructure server (503) proceeds to step 667.

In step 666, the infrastructure server (503) judges whether a time is before the blocking cancelling time or not. If the judgment is positive, the infrastructure server (503) proceeds to optional step 668, and then to step 670. Meanwhile, if the judgment is negative, the infrastructure server (503) proceeds to step 669.

In step 667, the infrastructure server (503) adds a description on the device into the GBL, based on the information on the update. The description may comprise the ID of the device (501), the blocking starting time, the blocking cancelling time and the number of blocking and further the ID of the relay device (502) and the information on the position of the relay device (502).

The blocking starting time may be set to, for example, but not limited to, a time when the improper device was detected first, or during the period between the blocking cancelling time and monitoring cancelling time of the previous detection by the infrastructure server or one or more relay devices.

A default value is set for the blocking cancelling time. The default value for the blocking cancelling time may be, for example, but not limited to, ten minutes.

A default value is set for the monitoring cancelling time. The default value for the monitoring cancelling time may be, for example, but not limited to, twenty minutes.

A default value is set for the number of blocking. The default value may be, for example, but not limited to, one.

Step 668 is optional to give penalty to an improper device frequently accessing to the IoT relay service. In step 668, the infrastructure server (503) postpones the blocking cancelling time and/or monitoring cancelling time and then updates the GBL by replacing the present blocking cancelling time with the new blocking cancelling time and/or replacing the present monitoring cancelling time with the new monitoring cancelling time, respectively. Further, the infrastructure server (503) updates information on the relay device (502), such as the ID of the relay device (502) which is now connected to the device (501), information on a position of the relay device (502), the blocking cancelling time, and the monitoring cancelling time.

The blocking cancelling time may be postponed by setting a value which is larger than an initial value as a default, considering the number of blocking. For example, a period from the blocking starting time to the time when the event was notified is added to the present blocking cancelling time.

The monitoring cancelling time may be postponed by setting a value which is larger than an initial value as a default, considering the number of blocking. For example, a period from the blocking starting time to the time when the event was notified is added to the present monitoring cancelling time.

In step 669, the infrastructure server (503) increments the number of blocking; postpones the blocking cancelling time and/or monitoring cancelling time by updating the corresponding descriptions in the GBL.

The number of blocking is incremented, for example, by one.

The blocking cancelling time may be postponed by setting a value which is larger than an initial value as a default, considering the number of blocking. For example, the set value may be, for example, but not limited to, twenty minutes for the second blockings; forty minutes for the third blockings.

The monitoring cancelling time may be postponed by setting a value which is larger than an initial value as a default, considering the number of blocking. For example, the set value may be, for example, but not limited to, forty minutes for the second blockings; eighty minutes for the third blockings.

In step 670, the infrastructure server (503) returns information on the updated description to one or more relay devices including the relay device (502) which exist in or near the position of the device (501) and/or to one or more relay devices including the relay device (502) which exist in or near the position associated with the position of the device (501).

In step 671, the infrastructure server (503) judges whether an inquiry of an ID of a relay device (502) is received or not. The inquiry may be sent in step 523 in Case 2 (592), step 535 in Case_3 (593), step 545 in Case_4 (594), step 556 in Case_5 (595), step 567 in Case_6 (596), step 572 in Case_7 (597) and step 581 in Case_8. (598). If the judgment is positive, the infrastructure server (503) proceeds to step 672. Meanwhile, if the judgment is negative, the infrastructure server (503) proceeds to step 673.

In step 672, the infrastructure server (503) returns information on the updated description to one or more relay devices including the relay device (502) which exist in or near the position of the device (501) and/or to one or more relay devices including the relay device (502) which exist in or near the position associated with the position of the device (501), if any.

In step 673, the infrastructure server (503) judges whether a request for terminating an IoT relay service is received or not. If the judgment is positive, the infrastructure server (503) proceeds to a final step 674. Meanwhile, if the judgment is negative, the infrastructure server (503) proceeds back to step 663.

In step 674, the infrastructure server (503) terminates the process mentioned above.

FIGS. 7A to 7E illustrate flowcharts of a process for managing, by a relay device which can be connected to a device, a blacklist used for controlling commutation from or to an improper device, or the LBL, according to Cases_1 to 8 (591 to 598) described in FIGS. 5A and 5B.

In this embodiment, an example of devices being IoT devices is described. However, this embodiment can be applied also to devices other than IoT devices, such as card devices, smartphones, mobile phones, tablets or notebook computers.

With reference now to FIG. 7A, FIG. 7A illustrates an embodiment of a process for blocking data whose destination is the service provider (504) via the infrastructure server (503).

In step 701, the relay device (502) starts the process mentioned above.

In step 702, the relay device (502) prepares a local black list (i.e. an LBL) and then initializes it to prepare an empty LBL. Further, the relay device (502) sets an IoT mode active in order to allow the relay device (502) to communicate with the device (501).

In step 703, the relay device (502) judges whether a request for a connection is received from the device (501) or not. The request for a connection may comprise, for example, but not limited to, an ID of the device (501), information on a position of the device (501) and the ID of the relay deice (502). If the judgment is positive, the relay device (502) proceeds to step 704 (this is applied for Cases_1 to 6 (591 to 596)). Meanwhile, if the judgment is negative, the relay device (502) proceeds to step 705.

In step 704, the relay device (502) performs a process for the received request for a connection. The detailed explanation of this process will be explained by referring to FIG. 7B.

In step 705, the relay device (502) judges whether data whose destination is the service provider (504) is received from the device (501) or not. If the judgment is positive, the relay device (502) proceeds to step 706 (this is applied for Cases_1 and 4 to 6 (591, and 594 to 596)). Meanwhile, if the judgment is negative, the relay device (502) proceeds to step 707.

In step 706, the relay device (502) performs a process for forwarding data which was sent from the device (501). The detailed explanation of this process will be explained by referring to FIG. 7C.

In step 707, the relay device (502) judges whether information on the update is received from the infrastructure server (503) or not. The information on the update may comprise, for example, but not limited to, the GBL itself or an ID or IDs, present in the GBL, or a subset of GBL or IDs, respectively, of one or more devices associated with the information on the position of the improper device (501). For, example, the information on the update may comprise a position of the device (501) or relay device (502), ID of the device (501), and ID of the relay device (503).

If the judgment is positive, the relay device (502) proceeds to step 708 (this is applied for Cases_2 to 8 (592 to 598)). Meanwhile, if the judgment is negative, the relay device (502) proceeds to step 709.

In step 708, the relay device (502) performs a process for updating a blacklist, i.e. an LBL, using the information on the update.

In step 709, the relay device (502) judges whether a request for terminating the IoT mode is received or not. If the judgment is positive, the relay device (502) proceeds to a final step 710. Meanwhile, if the judgment is negative, the relay device (502) proceeds back to step 703.

In step 710, the relay device (502) terminates the process mentioned above.

Figure 7B:
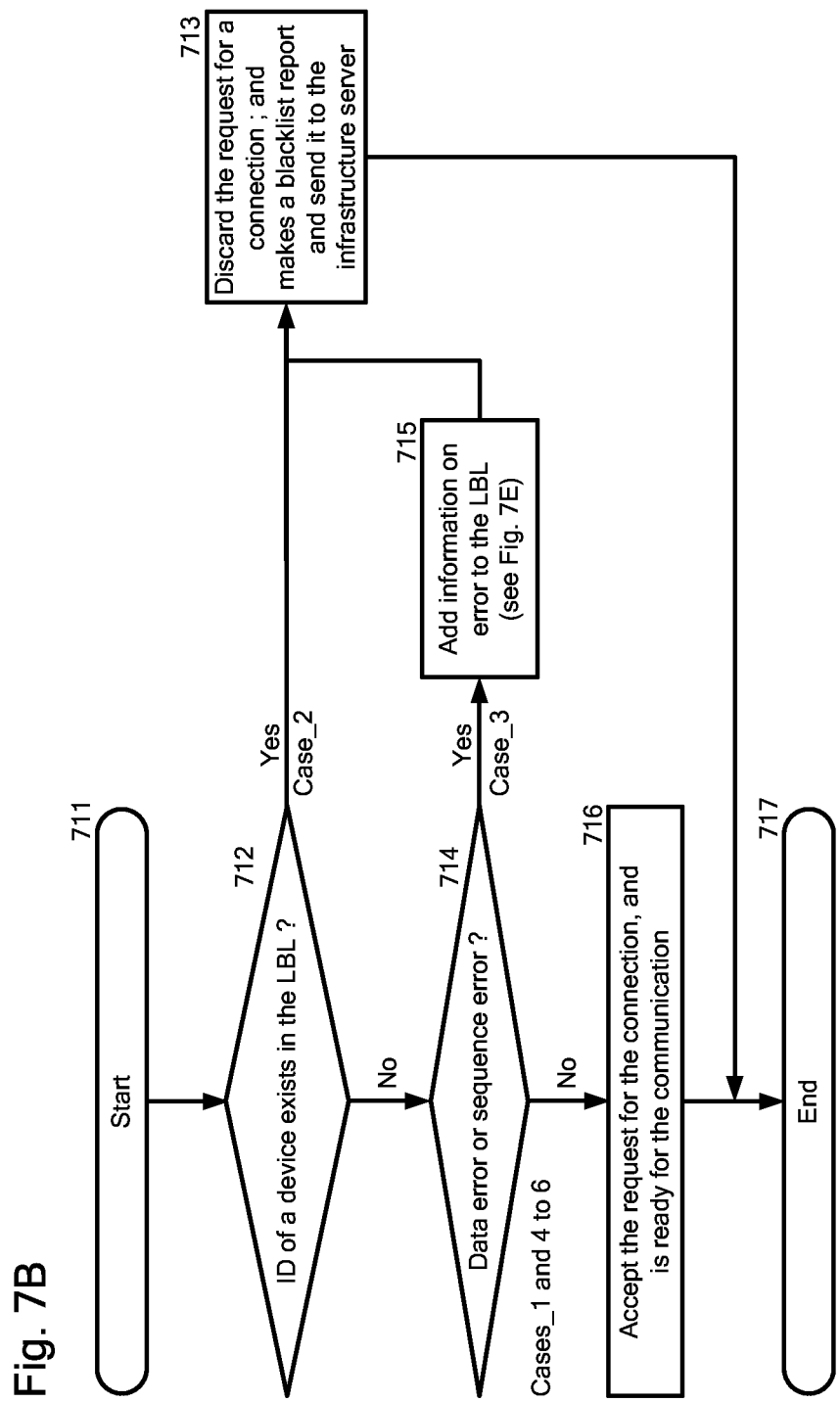
FIGS. 7A, 7B. 7C, 7D and 7E illustrate flowcharts of a process for managing, by a relay device which can be connected to a device, a blacklist used for controlling commutation from or to an improper device.

With reference now to FIG. 7B, FIG. 7B illustrates an embodiment of a process for the received request for a connection.

In step 711, the relay device (502) starts the process mentioned above.

In step 712, the relay device (502) judges whether an ID of the device (501) in the received request for a connection exists in the LBL or not. If the judgment is positive, the relay device (502) proceeds to step 713 (this is applied for Case_2 (592)). Meanwhile, if the judgment is negative, the relay device (502) proceeds to step 714 (this is applied for Cases_1 and 4 to 6 (591, and 594 to 596)).

In step 713, the relay device (502) discards the request for a connection, because the ID of the device is already registered in the LBL and disconnects the connection between the device (501) and the relay device (502). Further, the relay device (502) makes a blacklist report and then sends the blacklist report to the infrastructure server (503).

In step 714, the relay device (502) judges whether data error or sequence error is detected in the data which was sent from the device (501) or not. The data error may be, for example, but not limited to, a data format error. The sequence error may be, for example, but not limited to, an out of order of data which was divided for a packet, or error of a CRC. If the judgment is positive, the relay device (502) proceeds to step 715 (this is applied for Case_3 (593)). Meanwhile, if the judgment is negative, the relay device (502) proceeds to step 716.

In step 715, the relay device (502) adds information on the data error or sequence error in the LBL. The detailed explanation of this process will be explained by referring to FIG. 7E.

In step 716, the relay device (502) accepts the request for the connection, and is ready for the communication from the device (501).

In step 717, the relay device (502) terminates the process mentioned above.

Figure 7C:
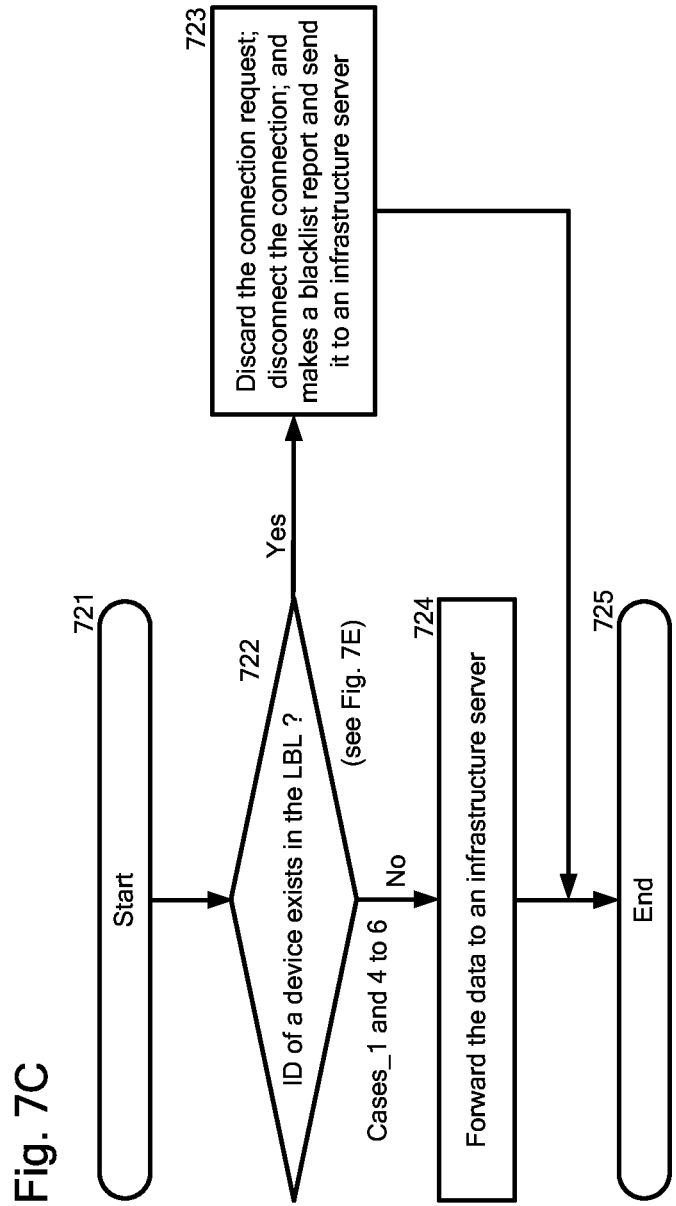

With reference now to FIG. 7C, FIG. 7C illustrates an embodiment of a process for forwarding data which was sent from the device (501).

In step 721, the relay device (502) starts the process mentioned above.

In step 722, the relay device (502) judges whether an ID of the device (501) in the received data exists in the LBL or not. If the judgment is positive, the relay device (502) proceeds to step 723. Meanwhile, if the judgment is negative, the relay device (502) proceeds to step 724 (this is applied for Cases_1 and 4 to 6 (591, and 594 to 596)).

In step 723, the relay device (502) discards the data, because the ID of the device is already registered in the LBL and disconnects the communication between the device (501) and the relay device (502). Further, the relay device (502) makes a blacklist report and then sends the blacklist report to the infrastructure server (503).

The step 723 is performed in a case where the LBL was updated based on information on update caused by another relay device or based on moving of the device (501) (see Case_7 (597)), based on a power-on of a device, after sending the acceptance of the request for the connection but before sending data.

In step 724, the relay device (502) forwards the data to the infrastructure server (503).

In step 725, the relay device (502) terminates the process mentioned above.

Figure 7D:
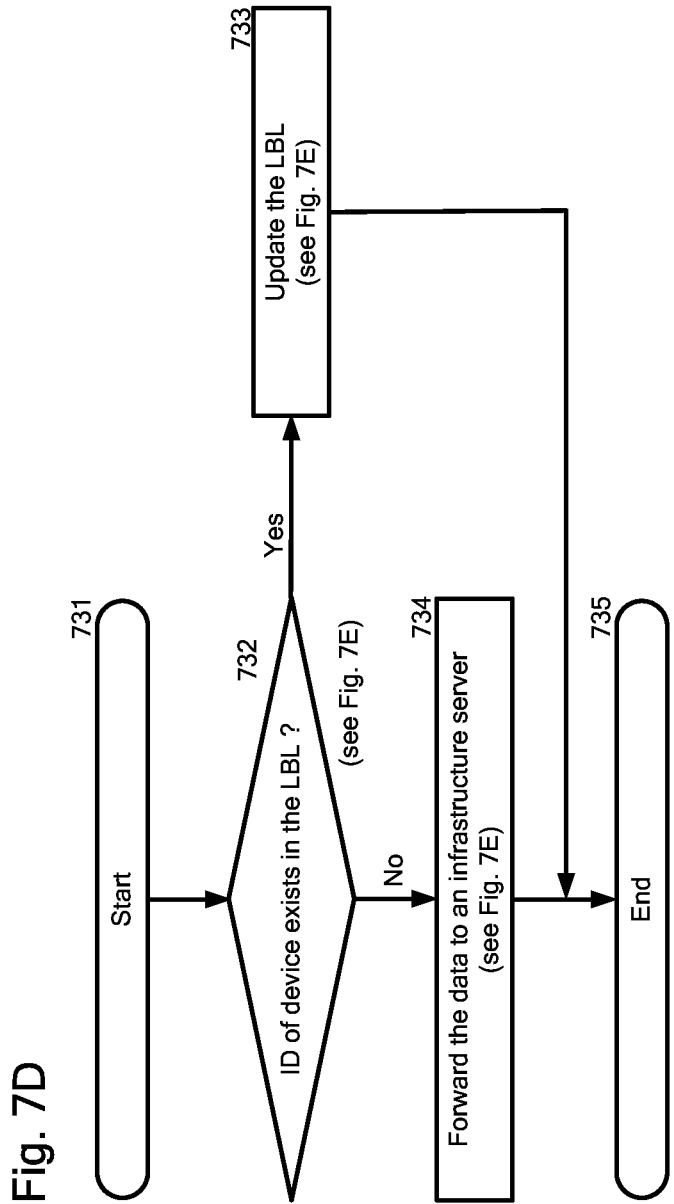

With reference now to FIG. 7D, FIG. 7D illustrates an embodiment of a process for updating the LBL, using the information on the update.

In step 731, the relay device (502) starts the process mentioned above.

In step 732, the relay device (502) judges whether an ID of the device (501) in the information on the update exists in the LBL or not. If the judgment is positive, the relay device (502) proceeds to step 733. Meanwhile, if the judgment is negative, the relay device (502) proceeds to step 734.

In step 733, the relay device (502) updates the LBL, using the information on the update.

In step 734, the relay device (502) forwards the data to the infrastructure server (503).

In step 735, the relay device (502) terminates the process mentioned above.

With reference now to FIG. 7E, FIG. 7E illustrates an embodiment of a process for updating the LBL on each of relay devices.

In step 741, the relay device (502) starts the process mentioned above.

In step 742, the relay device (502) initializes the LBL to prepare an empty LDL. An embodiment of the LDL is illustrated in FIG. 3C, as explained above.

In step 743, the relay device (502) deletes, from the LBL, a description on a device whose monitoring was finished.

In step 744, the relay device (502) judges whether information on the update which was sent from the infrastructure server (503) was received on the relay device (502) or not. If the judgment is positive, the relay device (502) proceeds to step 745 (this is applied for Cases_2 and 3 (592 and 593)). Meanwhile, if the judgment is negative, the relay device (502) proceeds to step 750.

In step 745, the relay device (502) judges whether the ID of the relay device (502) to be a subject already exists in the LBL or not. If the judgment is positive, the relay device (502) proceeds to step 746. Meanwhile, if the judgment is negative, the relay device (502) proceeds to step 747.

In step 746, the relay device (502) judges whether a time is before the blocking cancelling time or not. If the judgment is positive, the relay device (502) proceeds to step 748. Meanwhile, if the judgment is negative, the relay device (502) proceeds to step 749.

In step 747, the relay device (502) adds a description on the device into the LBL, based on the information on the update. The description may comprise the ID of the device (501), the blocking starting time, the blocking cancelling time and the number of blocking (502).

The blocking starting time may be set to, for example, but not limited to, a time when an event was notified. The event may be, for example, but not limited to, a detection of an improper device by a relay device, a server computer or a service provider.

A default value is set for the blocking cancelling time. The default value for the blocking cancelling time may be, for example, but not limited to, ten minutes.

A default value is set for the monitoring cancelling time. The default value for the monitoring cancelling time may be, for example, but not limited to, twenty minutes.

A default value is set for the number of blocking. The default value may be, for example, but not limited to, one.

The above-mentioned description added in the LBL will be overwritten in step 751 mentioned below by the description transferred from the infrastructure server (503) in a case where information on update is transferred from the infrastructure server (503).

In step 748, the relay device (502) postpones the blocking cancelling time and/or monitoring cancelling time and then updates the GBL by replacing the present blocking cancelling time with the new blocking cancelling time and/or replacing the present monitoring cancelling time with the new monitoring cancelling time, respectively. Further, the relay device (502) updates information on the relay device (502), such as information on a position of the relay device (502), the blocking cancelling time and the monitoring cancelling time.

The blocking cancelling time may be postponed by setting a value which is larger than an initial value as a default, considering the number of blocking. For example, a period from the blocking starting time to the time when the event was notified is added to the present blocking cancelling time.

The monitoring cancelling time may be postponed by setting a value which is larger than an initial value as a default, considering the number of blocking. For example, a period from the blocking starting time to the time when the event was notified is added to the present monitoring cancelling time.

The above-mentioned updated description in the LBL will be overwritten in step 751 by the description transferred from the infrastructure server (503) in a case where information on update is transferred from the infrastructure server (503).

In step 749, the relay device (502) increments the number of blocking; postpones the blocking cancelling time and/or monitoring cancelling time by updating the corresponding descriptions in the LBL.

The number of blocking is incremented, for example, by one.

The blocking cancelling time may be postponed by setting a value which is larger than an initial value as a default, considering the number of blocking. For example, the set value may be, for example, but not limited to, twenty minutes for the second blockings; forty minutes for the third blockings.

The monitoring cancelling time may be postponed by setting a value which is larger than an initial value as a default, considering the number of blocking. For example, the set value may be, for example, but not limited to, forty minutes for the second blockings; eighty minutes for the third blockings.

The above-mentioned updated description in the LBL will be overwritten in step 751 by the description transferred from the infrastructure server (503) in a case where information on update is transferred from the infrastructure server (503).

In step 750, the relay device (502) judges whether information on the update which was sent from the infrastructure server (503) was received on the relay device (502) or not. If the judgment is positive, the relay device (502) proceeds to step 751 (this is applied for Cases_2 to 8 (592 to 598)). Meanwhile, if the judgment is negative, the relay device (502) proceeds to step 753.

In step 751, the relay device (502) updates the description on the device (751), based on the information on the update or adds a description on the device into the LBL, based on the information on the update. The description may comprise the ID of the device (501), the blocking starting time, the blocking cancelling time and the number of blocking (502).

In step 752, the relay device (502) returns information on the updated description to the infrastructure server (503). Then the information is sent to the infrastructure as described in Step 723.

In step 753, the relay device (502) judges whether an inquiry of an ID of the relay device (502) is received or not. The inquiry may be used for investigating the existence of the device in the GBL, according to step 712 described in FIG. 7B. If the judgment is positive, the relay device (502) proceeds to step 754 (this is applied for Cases_1 to 6 (591 to 596)). Meanwhile, if the judgment is negative, the relay device (502) proceeds to step 755.

In step 754, the relay device (502) returns information on the updated description to the infrastructure server (503), if any.

In step 755, the relay device (502) judges whether a request for terminating the IoT mode is received or not. If the judgment is positive, the relay device (502) proceeds to a final step 756. Meanwhile, if the judgment is negative, the relay device (502) proceeds back to step 743.

In step 756, the relay device (502) terminates the process mentioned above.

FIG. 8 illustrates an embodiment of an overall functional block diagram of a server computer used in accordance with the embodiment of the flowchart described in FIGS. 6A to 6F.

The server computer (801) may comprise a blacklist managing section (811), a blacklist transferring section (812), a data receiving section (821) and a data forwarding section (822).

The blacklist managing section (811) may, add, into a blacklist (or a global blacklist, GBL) (891), information on a position of an improper device or information on a position associated with a position of an improper device, and an ID of the improper device, in response to a detection of the improper device.

The blacklist managing section (811) may delete a description on the improper device from the blacklist (891) at a lapse of the time when monitoring of the improper device is cancelled.

The blacklist managing section (811) may delete a description on the improper device from the blacklist (891) when the improper device is judged to be now proper.

The blacklist managing section (811) may judge whether the monitoring cancelling time lapses or not. If the judgment is positive, the blacklist managing section (811) may delete a description on the improper device from the blacklist. Accordingly, the blacklist can be managed in terms of the monitoring cancelling time.

The blacklist transferring section (812) may transfer the blacklist or an ID or IDs, present in the blacklist, respectively, of one or more devices associated with the information on the position of the improper device to one or more relay devices which exist in or near the position of the improper device and/or to one or more relay devices which exist in or near the position associated with the position of the improper device.

The data receiving section (821) may receive data sent from devices such as improper devices or true devices.

The data forwarding section (822) may forward data transferred from the improper device to the server computer at a lapse of the time when blocking of communication from or to the improper device is cancelled.

The data forwarding section (822) may forward the received data to a destination of the data in response to a receipt of data transferred from a true device corresponding to the malicious device via a relay device which is not associated with the position of the improper device or via a relay device which is not associated with the position associated with the position of the improper device.

The data forwarding section (822) may forward data transferred from the device whose instability is now resolved to a destination of this data when the instability is judged to be now resolved, after the time the time when blocking of communication from or to the improper device is cancelled.

The data forwarding section (822) may judge whether the blocking cancelling time lapses or not. If the judgment is positive, the data forwarding section (822) may forward to the server computer data transferred from the improper device. Therefore, if the blocking cancelling time lapses, the device listed in the blacklist can send data to the server computer. Accordingly, the device can be managed in terms of time and space.

The data forwarding section (822) may judge whether the server computer receives data transferred from a true device corresponding to the malicious device, such as a malicious device, via a relay device which is not associated with the position of the improper device or via a relay device which is not associated with the position associated with the position of the improper device. If the judgment is positive, the data forwarding section (822) may forward the received data to a destination of the data. The destination may be written in the data. The destination may be, for example, but not limited to, a service provider. Accordingly, in such situation, the true device can send data regardless of the existence of the improper device.

The data forwarding section (822) may judge whether the instability of an improper device, such as an unstable or malfunction device, is now resolved or not. If the judgment is positive, the data forwarding section (822) may forward the received data to a destination of the data. The destination may be written in the data. The destination may be, for example, but not limited to, a service provider. Accordingly, in a case where the instability is resolved, the true device can send data regardless of the existence of the improper device. Further, the blacklist managing section (811) may delete from the blacklist a description on the device whose instability is now resolved.

The data forwarding section (822) may judge whether the improper device is judged to be now proper or not. If the judgment is positive, the data forwarding section (822) may forward the received data to a destination of the data. The destination may be written in the data. The destination may be, for example, but not limited to, a service provider. Accordingly, in a case where the improper device is now judged to be now proper, this device is treated as true device. Further, the blacklist managing section (811) may delete from the blacklist a description on this device.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information on the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for managing a blacklist utilizing a server computer able to communicate with a device via a relay device connected to the device via a wireless network, the method comprising:
in response to a detection that a device is an improper device based on data transferred by the device to the relay device, adding, into a blacklist, information on at least one geographic position associated with a position of the improper device, and an identifier of the improper device, wherein the blacklist is used for controlling commutation or communication from or to the improper device; and
transferring the blacklist or an identifier or identifiers, present in the blacklist, respectively, of one or more devices associated with the information on the geographic position of the improper device to one or more relay devices which exist at or near the at least one geographic, position associated with the position of the improper device.

2. The method according to claim 1, wherein the blacklist further comprises a first time when blocking of communication from or to the improper device is cancelled, a second time when monitoring of the improper device is cancelled, or a combination thereof.

3. The method according to claim 2, wherein data transferred from the improper device to the relay device is forwarded to the server computer at a lapse of the first time.

4. The method according to claim 2, wherein a description on the improper device is deleted from the blacklist at a lapse of the second time.

5. The method according to claim 2, wherein the transferring further comprises transferring the first time in a case where the blocking of communication from or to the improper device is cancelled, the second time in a case where the monitoring of the improper device is cancelled, or a combination thereof.

6. The method according to claim 2, wherein the improper device is judged to have an instability or a malfunction, and wherein the method further comprises:
in a case where the instability or the malfunction is judged to be resolved causing the improper device to be a proper device, after the first time forwarding data transferred from the proper device to a destination of the data.

7. The method according to claim 1, wherein in a case where the improper device is judged to be proper, a description on the improper device is deleted from the blacklist.

8. The method according to claim 1, wherein the information on the at least one geographic position associated with the position of the improper device is selected from the group consisting of: information on a geographic position of the improper device, information on a geographic position of the relay device information on a geographic position of a base station which the relay device is connected to, information on a geographic position of an access point which the relay device is connected to, or combinations thereof.

9. The method according to claim 1, wherein the identifier or identifiers, present in the blacklist, respectively, of one or more devices associated with the information on the at least one geographic position associated with the position of the improper device is an identifier or identifiers of the one or more improper devices which are specified from information on the at least one geographic position associated with the position of the improper device.

10. The method according to claim 1, wherein the improper device is a malicious device, and wherein the method further comprises:
in response to a receipt of data transferred from a true device corresponding to the malicious device via a relay device which is not associated with the at least one geographic position associated with the position of the improper device, forwarding the received data to a destination of the data.

11. The method according to claim 1, wherein the improper device is an Internet of Things (IoT) device, a card device, a smartphone, a mobile phone, a tablet or a notebook computer.

12. The method according to claim 1, wherein in a case where the improper device is an Internet of Things (IoT) device, the information on the at least one geographic position associated with the position of the improper device is selected from the group consisting of; information on a geographic position of the relay device information on a geographic position of a base station which the relay device is connected to, information on a geographic position of an access point which the relay device is connected to, or combinations thereof.

13. The method according to claim 1, wherein the wireless network is a wireless personal network.

14. The method according to claim 13, wherein the wireless personal network is implemented using Bluetooth™ Low Energy, Bluetooth™ or Wi-Fi.

15. A server computer able to communicate with a device via a relay device connected to the device via a wireless network, the server computer comprising:
a memory storing a program which, when executed on a processor, performs an operation for managing a blacklist, the operation comprising:
in response to a detection that a device is an improper device based on data transferred by the device to the relay device, adding, into a blacklist, information on at least one geographic position associated with a position of the improper device, and an identifier of the improper device, wherein the blacklist is used for controlling commutation or communication from or to the improper device; and transferring the blacklist or an identifier or identifiers, present in the blacklist, respectively, of one or more devices associated with the information on the geographic position of the improper device to one or more relay devices which exist at or near the at least one geographic position associated with the position of the improper device.

16. The server computer according to claim 15, wherein the blacklist further comprises a first time when blocking of communication from or to the improper device is cancelled, a second time when monitoring of the improper device is cancelled, or a combination thereof.

17. The server computer according to claim 15, wherein data transferred from the improper device to the relay device is forwarded to the server imputer at a lapse of the first time, or a description on the improper device is deleted from the blacklist at a lapse of the second time.

18. A computer program product for managing a blacklist utilizing a server computer able to communicate with a relay device connected to the device via a wireless network, the computer program product comprising a computer readable storage medium having program instructions is embodied therewith, wherein the computer readable storage medium is not a transitory signal per se, the program instructions executable by a computer to cause the computer to perform a method comprising:

in response to a detection that a device is an improper device based data transferred by the device to the relay device, adding, into a blacklist, information on at least one geographic position associated with a position of the improper device, and an identifier of the improper device, wherein the blacklist is used for controlling commutation or communication from or to the improper device; and transferring the blacklist or an identifier or identifiers, present in the blacklist, respectively, of one or more devices associated with the information on the geographic position of the improper device to one or more relay devices which exist at or near the a least one geographic position associated with the position of the improper device.

19. The computer program product according to claim 18, wherein the blacklist further comprises a first time when blocking of communication from or to the improper device is cancelled, a second time when monitoring of the improper device is cancelled, or a combination thereof.

20. The computer program product according to claim 18, wherein data transferred from the improper device to the relay device is forwarded to the server computer at a lapse of the first time, or a description on the improper device is deleted from the blacklist at a lapse of the second time.

* * * * *